(12) United States Patent
Kim et al.

(10) Patent No.: US 10,642,446 B2
(45) Date of Patent: May 5, 2020

(54) USER INPUT PROCESSING METHOD AND ELECTRONIC DEVICE PERFORMING THE SAME

(71) Applicant: Samsung Electronics Co., Ltd., Gyeonggi-do (KR)

(72) Inventors: So Young Kim, Gyeonggi-do (KR); Wan Ho Roh, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 224 days.

(21) Appl. No.: 15/616,017

(22) Filed: Jun. 7, 2017

(65) Prior Publication Data

US 2017/0364238 A1    Dec. 21, 2017

(30) Foreign Application Priority Data

Jun. 17, 2016   (KR) .................. 10-2016-0075982

(51) Int. Cl.

| | | |
|---|---|---|
| *G06F 17/20* | (2006.01) | |
| *G06F 3/0481* | (2013.01) | |
| *G06F 16/27* | (2019.01) | |
| *G06F 3/041* | (2006.01) | |
| *G06F 3/0488* | (2013.01) | |
| *G06F 8/65* | (2018.01) | |
| *G06F 3/01* | (2006.01) | |
| *G06F 3/0482* | (2013.01) | |

(52) U.S. Cl.
CPC ........ *G06F 3/04817* (2013.01); *G06F 3/0414* (2013.01); *G06F 3/0488* (2013.01); *G06F 8/65* (2013.01); *G06F 16/275* (2019.01); *G06F 3/016* (2013.01); *G06F 3/0482* (2013.01); *G06F 2203/04105* (2013.01)

(58) Field of Classification Search
CPC .................... G06F 3/04817; G06F 3/0482
See application file for complete search history.

(56) References Cited

U.S. PATENT DOCUMENTS

| | | | | |
|---|---|---|---|---|
| 8,434,020 | B2 * | 4/2013 | Martyn | H04M 1/72552 715/808 |
| 9,170,708 | B2 * | 10/2015 | Chaudhri | G06F 3/0482 |
| 9,300,645 | B1 * | 3/2016 | Rao | H04L 63/08 |
| 9,830,808 | B2 * | 11/2017 | Selfe | G08C 17/02 |
| 2005/0231414 | A1 * | 10/2005 | Chu | G08C 17/00 341/175 |
| 2009/0235185 | A1 * | 9/2009 | Gill | G06F 16/27 715/760 |
| 2013/0024794 | A1 * | 1/2013 | Ha | G06F 3/0485 715/765 |

(Continued)

*Primary Examiner* — Mohammed H Zuberi
(74) *Attorney, Agent, or Firm* — Cha & Reiter, LLC

(57) ABSTRACT

An electronic device and method are disclosed herein. The electronic device includes a display, an input module, and a processor. The processor executes the method, including displaying a group icon representing a plurality of icons associated with a plurality of applications in a display, setting a function associated with at least two applications of the plurality of applications for execution in response to a specified user input to the group icon, and executing the at least two applications and the set function in response to detecting the specified user input associated with the group icon.

20 Claims, 14 Drawing Sheets

(56) References Cited

U.S. PATENT DOCUMENTS

| | | | |
|---|---|---|---|
| 2014/0091912 A1* | 4/2014 | Lazarro | G08C 19/00 340/12.52 |
| 2014/0232739 A1* | 8/2014 | Kim | G09G 5/14 345/592 |
| 2015/0067602 A1 | 3/2015 | Bernstein et al. | |
| 2019/0146655 A1* | 5/2019 | Lee | G06F 3/04817 715/835 |

* cited by examiner

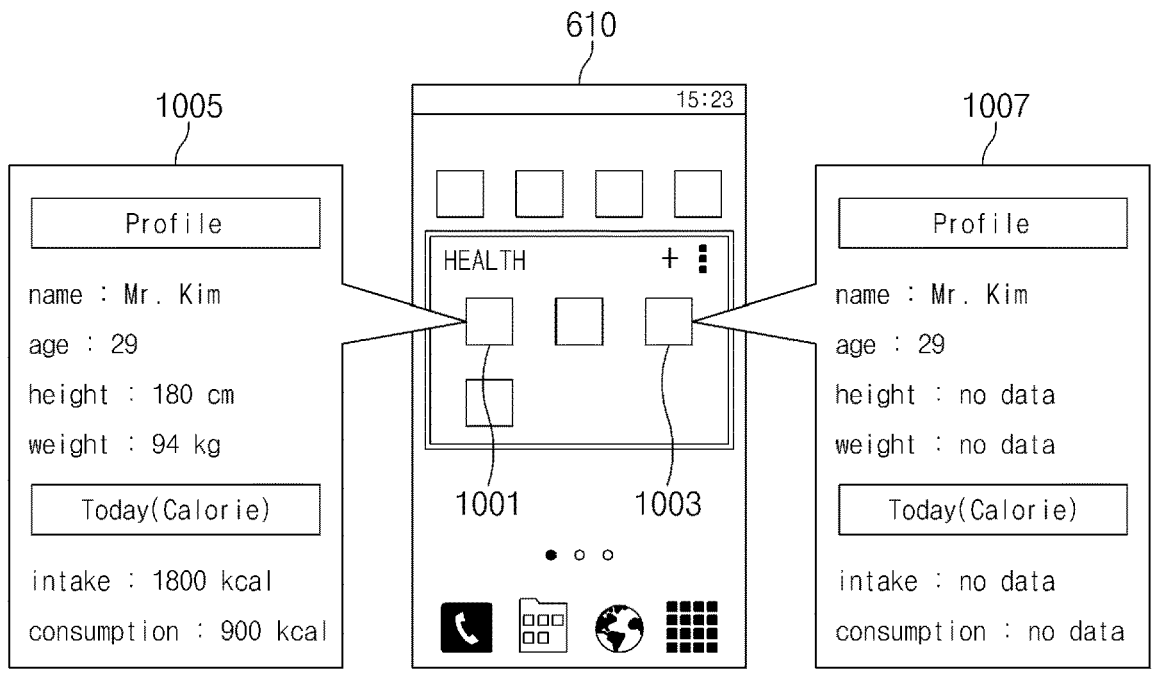
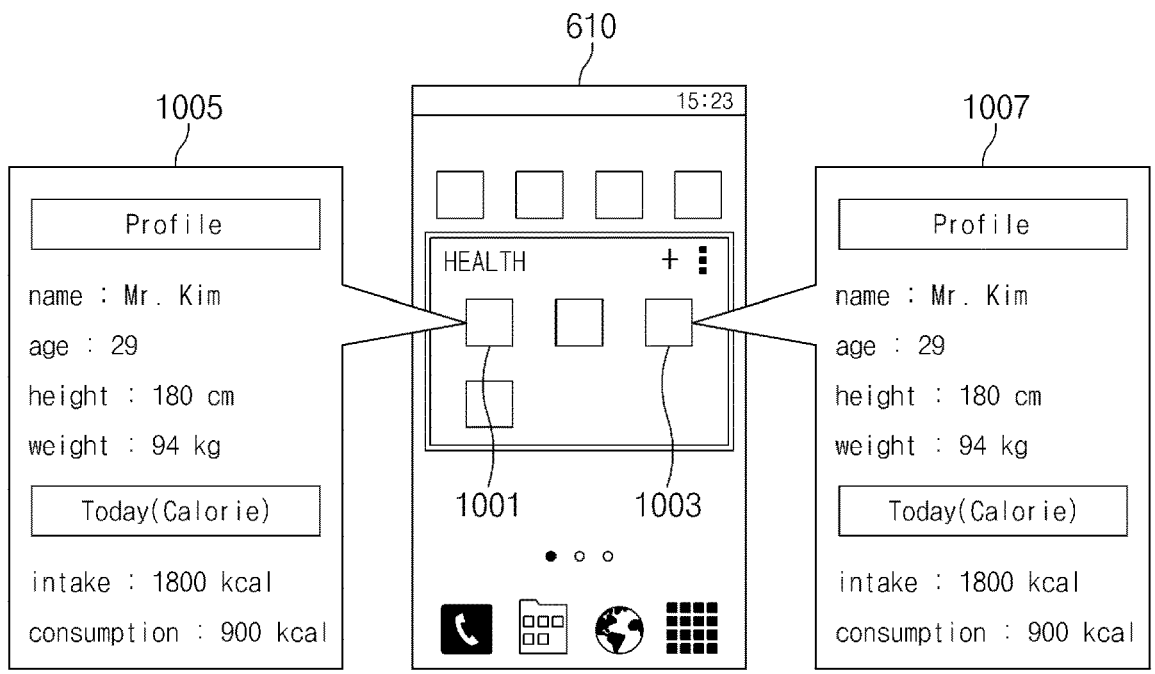
FIG.10

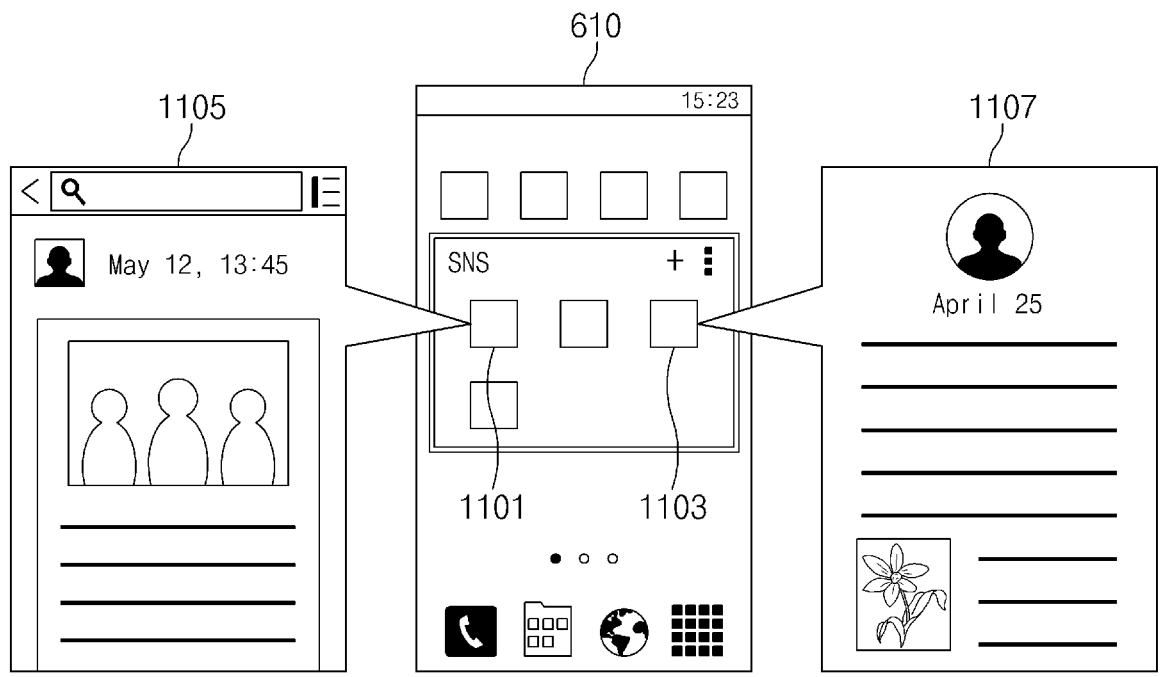
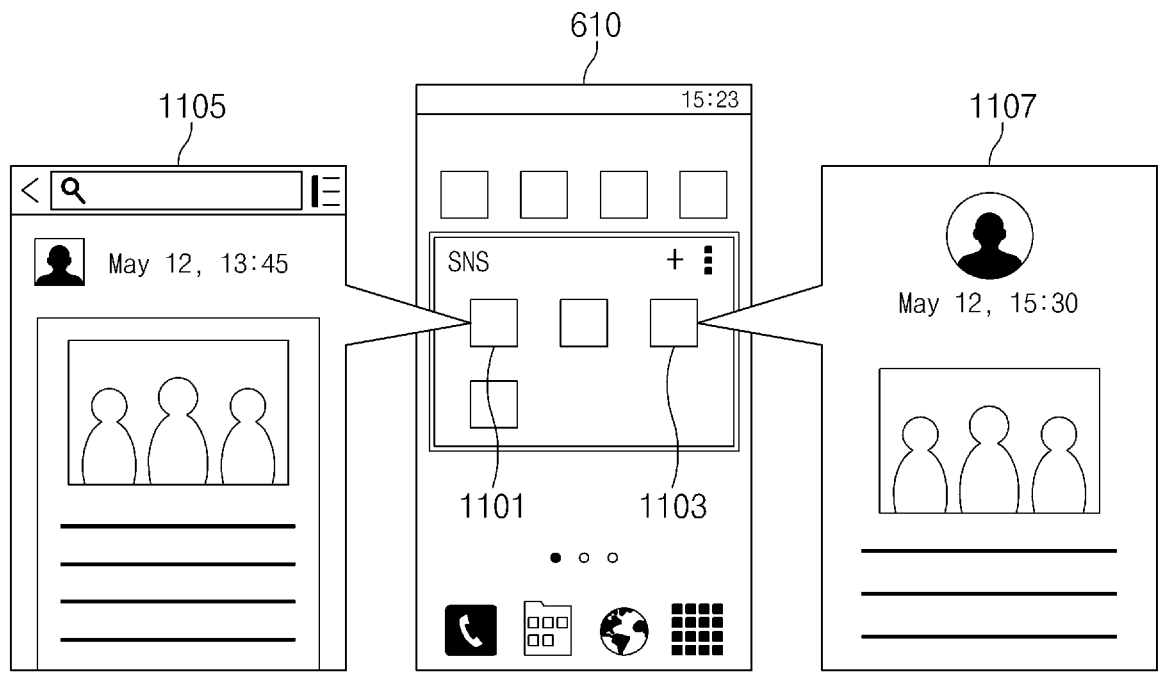
FIG.11

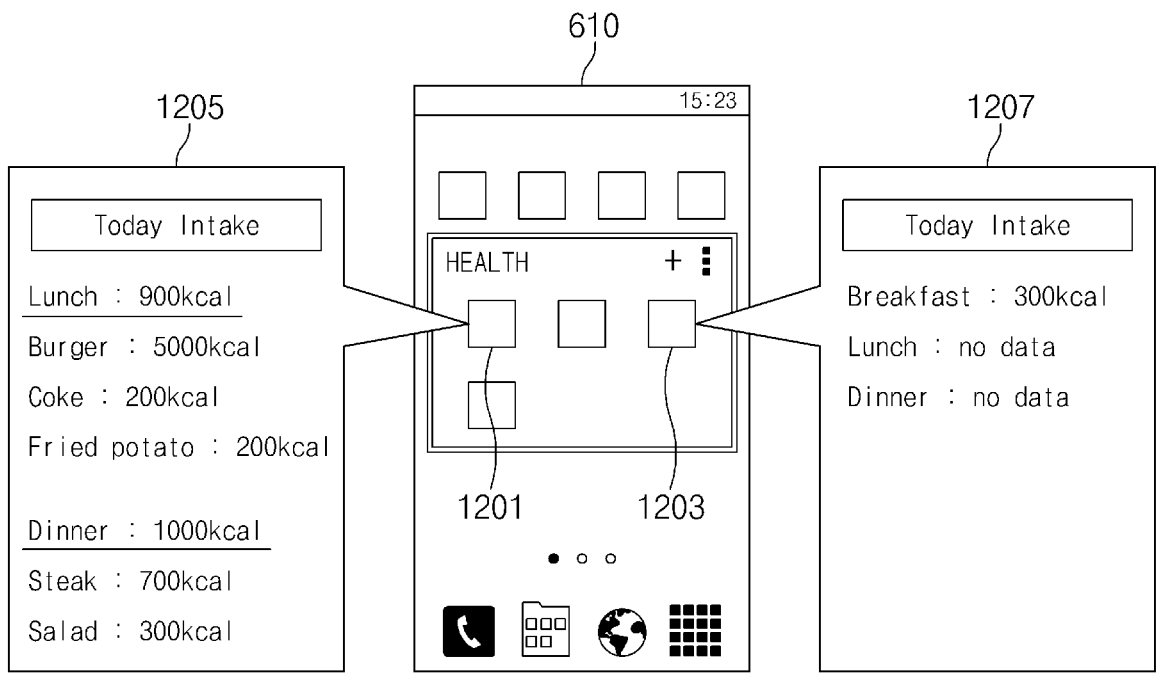
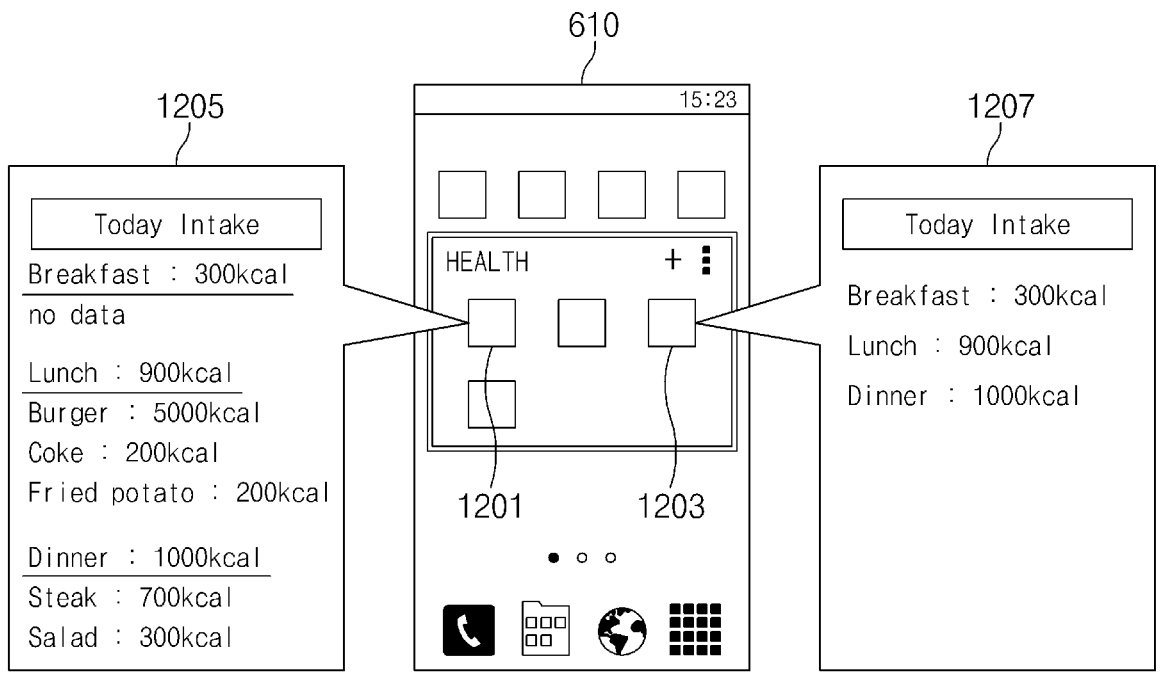
FIG.12

USER INPUT PROCESSING METHOD AND ELECTRONIC DEVICE PERFORMING THE SAME

CLAIM OF PRIORITY

This application claims the benefit under 35 U.S.C. § 119(a) of a Korean patent application filed on Jun. 17, 2016 in the Korean Intellectual Property Office and assigned Serial number 10-2016-0075982, the entire disclosure of which is hereby incorporated by reference.

TECHNICAL FIELD

The present disclosure relates to a method of processing a user input received by an electronic device.

BACKGROUND

With the development of mobile communication technologies, electronic devices may freely connect to a wireless/wired network and are easily portable. For example, the electronic device, such as a smartphone or a tablet PC, supports various functions such as a call function and a function to transmit or receive a message based on application programs installed in the electronic device.

The application programs installed in the electronic device may be executed through selection of application icons. As the number of application programs installed in the electronic device increases, it is increasingly inconvenient to manage the application icons. As such, the electronic device may provide a group icon function, such that the similar types of applications are managed as a single group.

A user may place similar applications in one group icon (or a folder), and may employ or manage the similar kinds of applications collectively. The user may easily manage application icons by accessing a plurality of application icons through the group icon.

However, to execute the same or similar function on each of applications included in the group icon, the user needs to repeatedly execute the same operation on each of a plurality of applications included in the group icon.

SUMMARY

Aspects of the present disclosure are to address at least the above-mentioned problems and/or disadvantages and to provide at least the advantages described below.

Various embodiments of the present disclosure are directed to execute the same or similar function on a plurality of applications included in one group icon by performing single user manipulation on the group icon.

In accordance with an aspect of the present disclosure, an electronic device includes a display, an input module, and a processor. The processor controls the display to display a group icon representing a plurality of icons associated with a plurality of applications, sets a function associated with at least two applications of the plurality of applications for execution in response to a specified user input to the group icon, and executes the at least two applications and the set function in response to detecting the specified user input to the group icon.

In accordance with an aspect of the present disclosure, a method in an electronic device is disclosed, including displaying a group icon representing a plurality of icons associated with a plurality of applications in a display, setting a function associated with at least two applications of the plurality of applications for execution in response to a specified user input to the group icon, and executing the at least two applications and the set function in response to detecting the specified user input associated with the group icon.

In accordance with an aspect of the present disclosure, an electronic device includes a housing including a first surface oriented in a first direction and a second surface oriented in a second direction opposite to the first direction, a touch screen interposed between the first surface and the second surface and exposed to an exterior of the electronic device through the first surface, a pressure sensor interposed between the first surface and the second surface and that detects pressure of an external object placed against the touch screen, a processor disposed within the housing and electrically coupled with the touch screen and the pressure sensor, and a memory disposed within the housing and electrically coupled with the processor. The memory stores a plurality of application programs. The memory stores instructions executable by the processor to control the touch screen to display a group icon representing a plurality of icons associated with a plurality of applications, in response to detecting a user input, detect an applied pressure the user input against the touch screen using the pressure sensor, detect a location of the user input using the touch screen, execute a selected function associated with at least two applications of the plurality of applications when the detected pressure meets a specified pressure threshold and the detected location indicates the group icon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a view illustrating a synchronization result, according to various embodiments of the present disclosure.

FIG. 11 is a view illustrating a synchronization result, according to various embodiments of the present disclosure;

FIG. 12 is a view illustrating a synchronization result, according to various embodiments of the present disclosure;

Throughout the drawings, it should be noted that like reference numbers are used to depict the same or similar elements, features, and structures.

DETAILED DESCRIPTION

Figure 1:
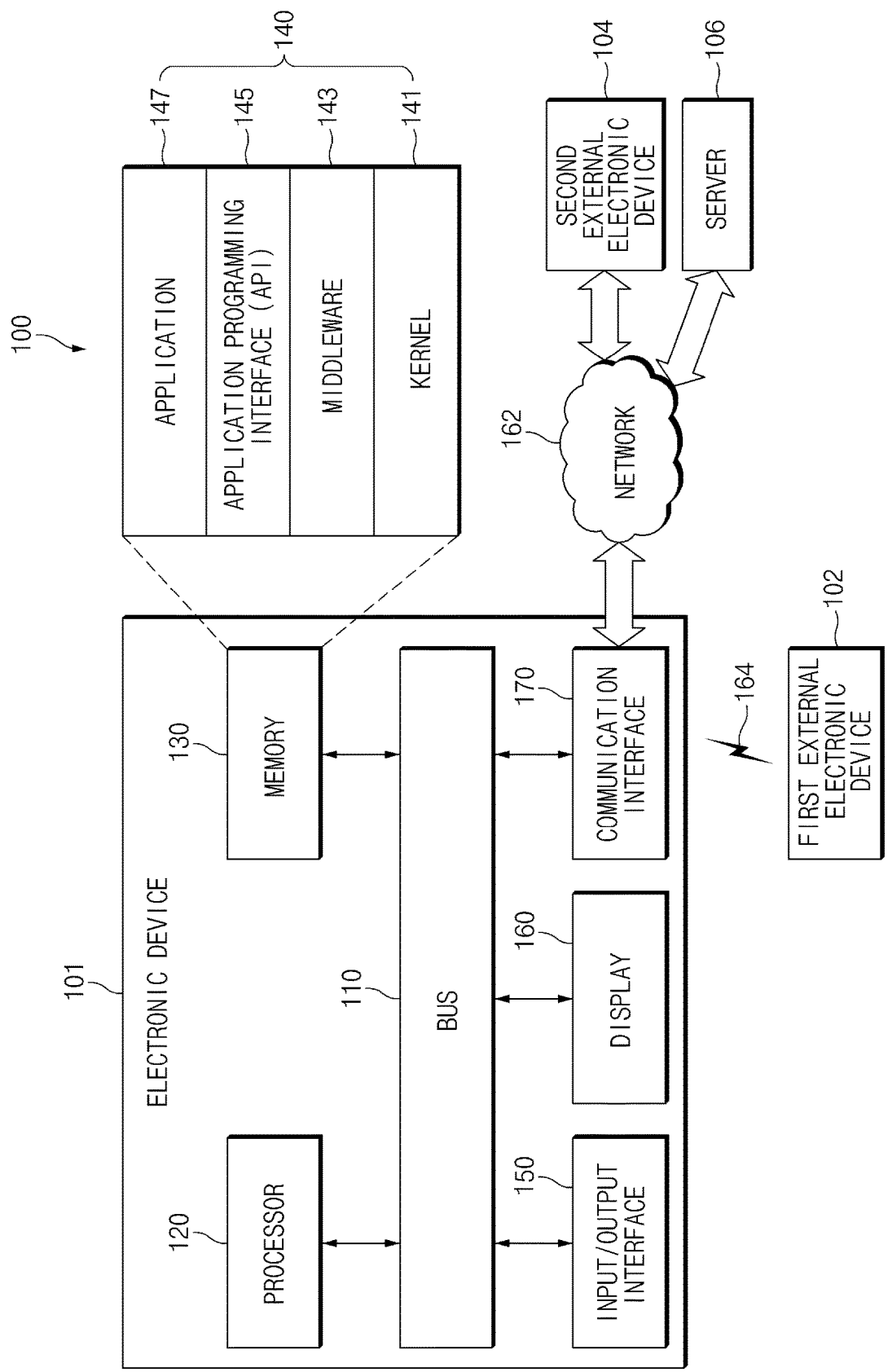
FIG. 1 illustrates an electronic device, according to various embodiments.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or Play Station™), an electronic dictionary, an electronic key, a camcorder, or an electronic picture frame.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/ structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

An electronic device 101 in a network environment 100 according to various embodiments of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of wireless fidelity (Wi-Fi), Bluetooth, Bluetooth low energy (BLE), Zigbee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
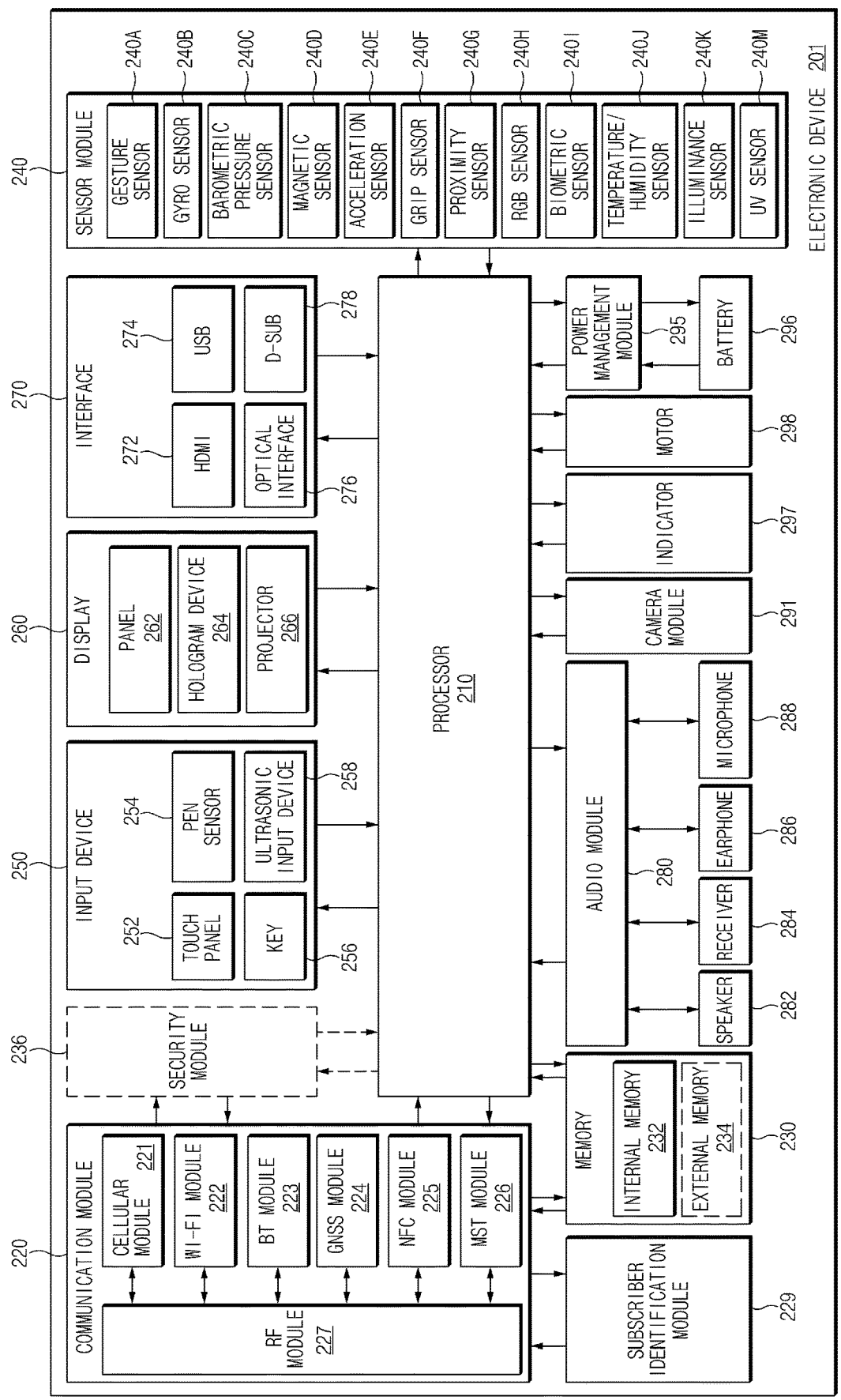
FIG. 2 illustrates a block diagram of the electronic device, according to various embodiments.

FIG. 2 is a block diagram illustrating an electronic device according to an embodiment of the present disclosure.

Referring to FIG. 2, an electronic device 201 may include, for example, a part or the entirety of the electronic device 101 illustrated in FIG. 1. The electronic device 201 may include at least one processor (e.g., AP) 210, a communication module 220, a subscriber identification module (SIM) 229, a memory 230, a sensor module 240, an input device 250, a display 260, an interface 270, an audio module 280, a camera module 291, a power management module 295, a battery 296, an indicator 297, and a motor 298.

The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 222, a Bluetooth module 223, a GNSS module 224 (e.g., a GPS module, a GLONASS module, a BeiDou module, or a Galileo module), an NFC module 225, an MST module 226 and a radio frequency (RF) module 227.

The cellular module 221 may provide, for example, a voice call service, a video call service, a text message service, or an Internet service through a communication network. The cellular module 221 may identify and authenticate the electronic device 201 in the communication network using the subscriber identification module 229 (e.g., a SIM card). The cellular module 221 may perform at least a part of functions that may be provided by the processor 210. The cellular module 221 may include a communication processor (CP).

Each of the Wi-Fi module 222, the Bluetooth module 223, the GNSS module 224, the NFC module 225 and the MST module 226 may include, for example, a processor for processing data transmitted/received through the modules. According to some various embodiments of the present disclosure, at least a part (e.g., two or more) of the cellular module 221, the Wi-Fi module 222, the Bluetooth module 223, the GNSS module 224, the NFC module 225 and the MST module 226 may be included in a single integrated chip (IC) or IC package.

The RF module 227 may transmit/receive, for example, communication signals (e.g., RF signals). The RF module 227 may include, for example, a transceiver, a power amp module (PAM), a frequency filter, a low noise amplifier (LNA), an antenna, or the like. According to another embodiment of the present disclosure, at least one of the cellular module 221, the Wi-Fi module 222, the Bluetooth module 223, the GNSS module 224, the NFC module 225 and the MST module 226 may transmit/receive RF signals through a separate RF module.

The SIM 229 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

A security module 236, which is a module including a storage space that is higher in security level than the memory 230, may be a circuit for securing safe data storage and protected execution circumstances. The security module 236 may be implemented with an additional circuit and may include an additional processor. The security module 236 may be present in an attachable smart chip or SD card, or may include an embedded secure element (eSE), which is installed in a fixed chip. Additionally, the security module 236 may be driven in another OS which is different from the OS of the electronic device 201. For example, the security module 236 may operate based on a java card open platform (JCOP) OS.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like.

Figure 3:
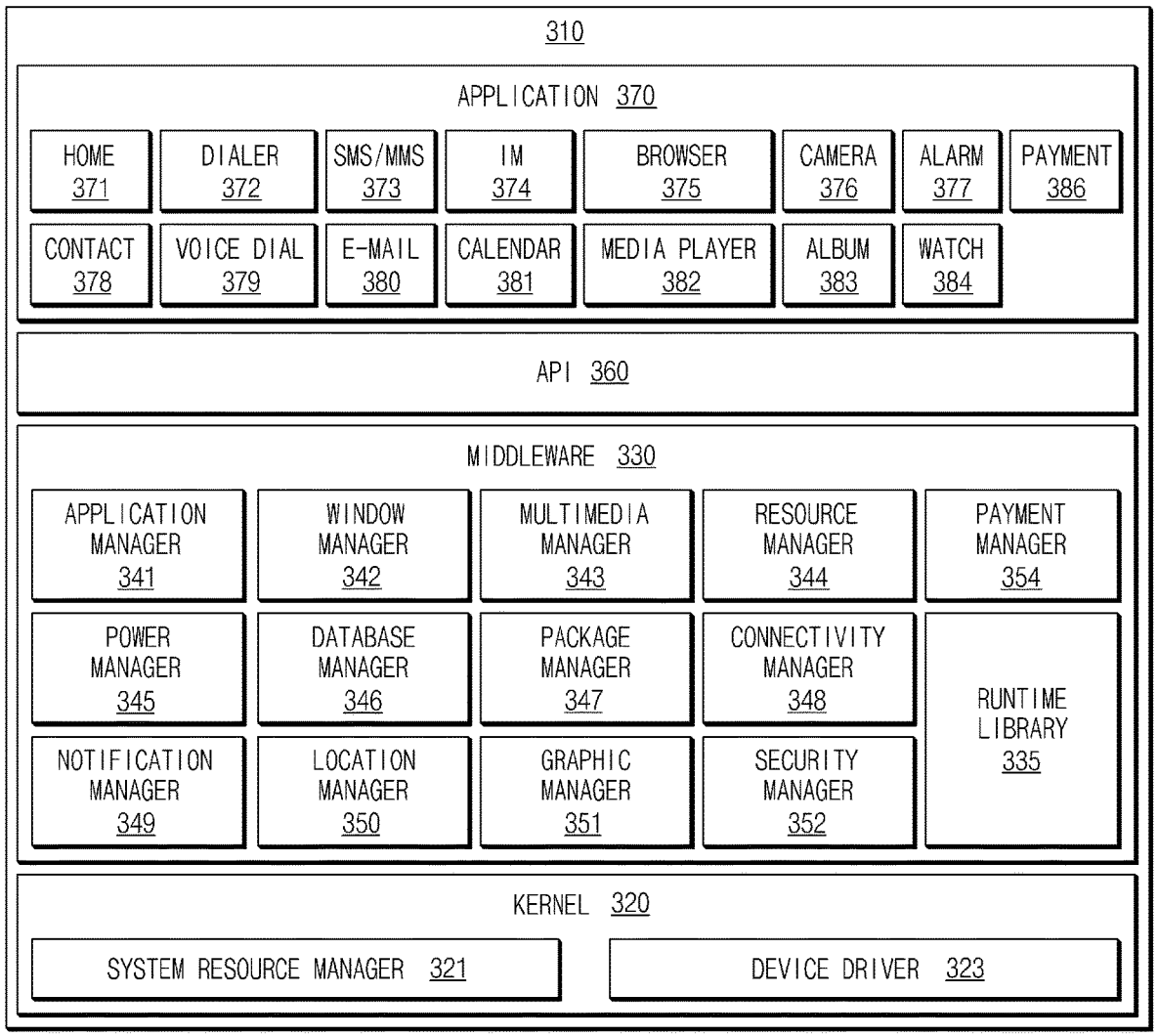
FIG. 3 illustrates a block diagram of a program module, according to various embodiments.

FIG. 3 is a block diagram illustrating a program module according to an embodiment of the present disclosure.

Referring to FIG. 3, a program module 310 (e.g., the program 140) may include an operating system (OS) for controlling a resource related to an electronic device (e.g., the electronic device 101) and/or various applications (e.g., the application program 147) running on the OS. The operating system may be, for example, Android, iOS, Windows, Symbian, Tizen, or the like.

The program module 310 may include a kernel 320, a middleware 330, an API 360, and/or an application 370. At least a part of the program module 310 may be preloaded on an electronic device or may be downloaded from an external electronic device (e.g., the first electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 utilize in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352 and a payment manager 354.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format utilized for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information utilized for operating the electronic device. The database manager 346 may generate, search, or modify a database to be used in at least one of the applications 370. The package manager 347 may manage installation or update of an application distributed in a package file format.

The connectivity manager 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions utilized for system security or user authentication. According to an embodiment of the present disclosure, in the case in which an electronic device (e.g., the electronic device 101) includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a clock 384, a payment 385, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 370 may include a specified application (e.g., a healthcare application of a mobile medical device) according to an attribute of the external electronic device (e.g., the first electronic device 102 or the second external electronic device 104). The application 370 may include an application received from an external electronic device (e.g., the first electronic device 102 or the second external electronic device 104). The application 370 may include a preloaded application or a third-party application downloadable from a server. The names of the elements of the program module 310 illustrated may vary with the type of an operating system.

According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
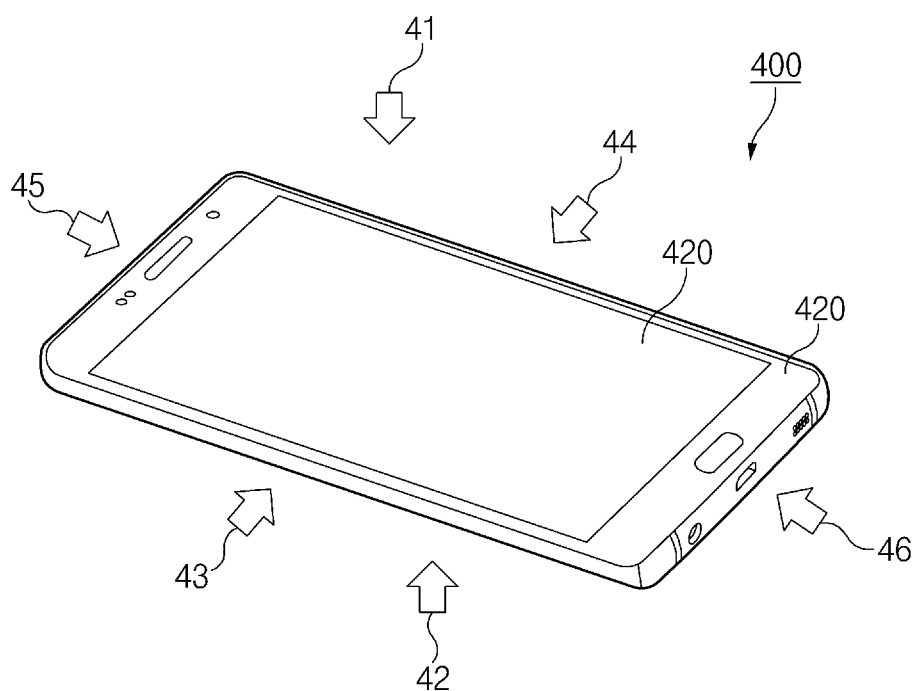
FIG. 4 illustrates an appearance of an electronic device, according to an embodiment.

FIG. 4 illustrates an appearance of an electronic device, according to an embodiment.

Referring to FIG. 4, according to an embodiment, an electronic device 400 may include a display 410 and a housing 420 in appearance. Various circuits, modules, or the like such as a processor, a memory, and the like may be disposed inside the electronic device 400 (i.e., inside the housing 420).

According to various embodiments, the display 410 may be disposed on a front surface of the electronic device 400. For example, the display 410 may be disposed in an internal space between a front surface (a first surface) facing in an upper direction 41 (a first direction) and a rear surface (a second surface) facing in a lower direction 42 (a second direction) and may be exposed to the outside through the front surface.

According to various embodiments, the display 410 may output content (e.g., a text, an image, a video, an icon, a widget, a symbol, or the like) and may receive a touch input (e.g., including a touch, a hovering, or "a force touch" or a contact-based touch input meeting a threshold pressure level) from a user. To this end, the display 410 may include, for example, a cover glass, a display panel, a touch panel, a fingerprint sensor, and/or a pressure sensor. The cover glass, the display panel, the touch panel, the fingerprint sensor, and/or the pressure sensor may be disposed in a stacking manner with an area (e.g., substantially the same area) corresponding to each other (refer to FIG. 5).

According to various embodiments, the display 410 may be disposed on the front surface of the electronic device 400 and may further extend from the front surface to at least one side surface. For example, the display 410 may extend in a left-side direction 43 and/or a right-side direction 44. The display 410 may be exposed to the outside through left-right side surfaces in addition to the front surface by extending in the left-side direction 43 and/or the right-side direction 44.

According to various embodiments, the housing 420 may constitute at least a part of the appearance of the electronic device 400. For example, the housing 420 may include a front surface (the first surface) facing in the upper direction 41 (the first direction), a rear surface (a second surface) opposite to the front surface, and a side surface surrounding at least a part of a space between the front surface (the first surface) and the rear surface (the second surface). The side surface may include a left-side surface facing in the left-side direction 43, a right-side surface facing in the right-side direction 44, an upper-side surface facing in an upper-side direction 45, and a bottom-side surface facing in a bottom-side direction 46.

According to various embodiments, to protect various elements in the electronic device 400 from an external shock or dust, the housing 420 may be formed of a plastic injection molding material, a conductive material (e.g., metal), or a combination thereof. According to an embodiment, the housing 420 may be used to be referred to as the "outer surface of a plurality of elements". For example, the front surface of the housing 420 may correspond to the cover glass, the side surface of the housing 420 may correspond to a side surface member of a rear case (or a rear plate), and a rear surface of the housing 420 may correspond to a back cover of a battery.

Figure 5:
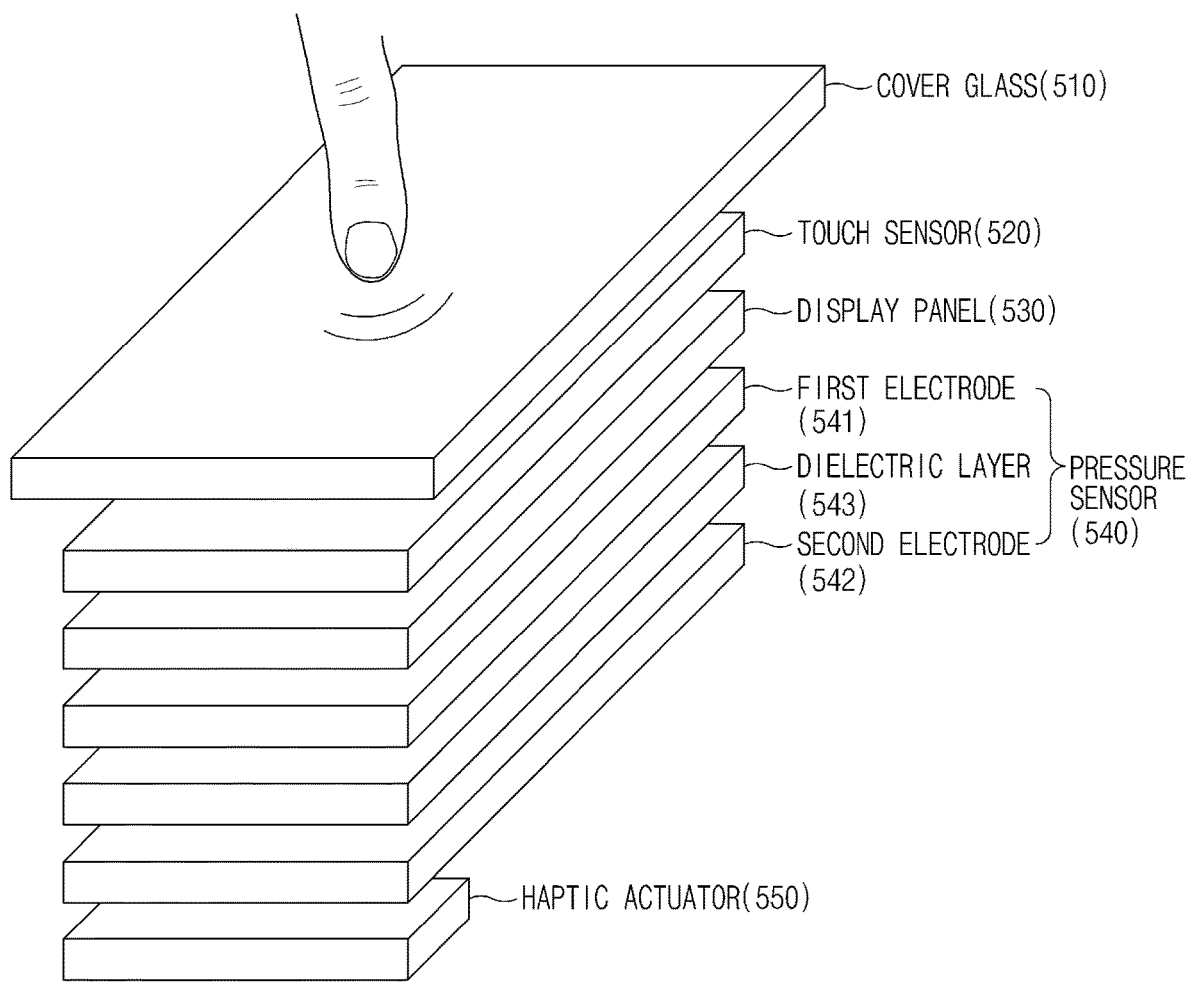
FIG. 5 illustrates a stacked structure of a display, according to an embodiment.

FIG. 5 illustrates a stacked structure of a display, according to an embodiment.

Referring to FIG. 5, according to an embodiment, the stacked structure of the display is illustrated. For example, the stacked structure may be applied to the display 410 illustrated in FIG. 4.

In the stacked structure of a display according to an embodiment, a cover glass 510 may be disposed in an internal space between a front surface (a first surface) of a disposed electronic device and a rear surface (a second surface) (not illustrated) of a housing. The cover glass 510 may be exposed through the front surface (the first surface) of the electronic device and may pass light generated by a display panel 530. A user may touch a portion (e.g., a finger) of his/her body (e.g., a finger) on the cover glass 510 to perform a "touch" (including a contact using an electronic pen). For example, the cover glass 510 may include tempered glass, reinforced plastics, or a flexible polymer material. Accordingly, it may be possible to protect a display and an electronic device equipped with the display from an external impact. According to various embodiments, the cover glass 510 may be also referred to a glass window or a cover window.

According to various embodiments, the touch sensor 520 may be disposed in the internal space between the front surface (the first surface) of the electronic device, in which the cover glass 510 is disposed, and the rear surface (the second surface) (not illustrated) of the housing of the electronic device. In the touch sensor 520, a specified physical quantity (e.g., voltage, light intensity, resistance, charge amount, capacitance, or the like) may vary due to the touch from the user. For example, the touch sensor (e.g., a touch panel) 520 may include a capacitive touch panel, a pressure-sensitive touch panel, an infrared touch panel, a resistive touch panel, a piezo touch panel, or the like. According to various embodiments, the touch sensor 520 may be referred to as various names such as a touch panel and the like, based on an implementation shape.

According to various embodiments, the display panel 530 may output content (e.g., a text, an image, a video, an icon, a widget, a symbol, or the like). For example, the display panel 530 may include a liquid crystal display (LCD) panel, a light-emitting diode (LED) display panel, an organic LED (OLED) display panel, a microelectromechanical systems (MEMS) display panel, or an electronic paper display panel.

According to various embodiments, the display panel 530 may be integrally implemented with the touch sensor 520 (or the touch panel). In this case, the display panel 530 may be also referred to a touch screen panel (TSP) or a touch screen display panel.

According to various embodiments, the pressure sensor 540 may be disposed in the internal space between the front surface (the first surface) of the electronic device, in which the cover glass 510 is disposed, and the rear surface (the second surface) (not illustrated) of the housing of the electronic device. The pressure sensor 540 may sense pressure (or force) of the outside (e.g., the finger of the user) against the cover glass 510. According to an embodiment, the pressure sensor 540 may include a first electrode 541, a second electrode 542, and a dielectric layer 543. For example, the pressure sensor 540 may sense the pressure of the touch, based on the capacitance between the first electrode 541 and the second electrode 542 varying by the touch.

According to an embodiment, the first electrode 541 and/or the second electrode 542 may be implemented to be transparent or opaque. For example, if implemented to be opaque, the first electrode 541 and/or the second electrode 542 may include copper (Cu), silver (Ag), magnesium (Mg), titanium (Ti), or opaque graphene. In addition, if implemented to be transparent, the first electrode 541 and/or the second electrode 542 may include indium tin oxide (ITO), indium zinc oxide (IZO), Ag nanowire, metal mesh, a transparent conducting polymer, or transparent graphene.

For example, one of the first electrode 541 and the second electrode 542 may be implemented with one metal plate that performs a role of a ground GND, and the other thereof may be formed to have a repeated polygon pattern by using the above-mentioned member (so-called, a self-capacitance manner). As another example, one (e.g., a transmission terminal Tx) of the first electrode 541 and the second electrode 542 may be formed of a pattern extending in a first direction, and the other (e.g., a reception terminal Rx) thereof may be formed of a pattern extending in a second direction intersecting with the first direction at a specified angle (e.g., a right angle) (so-called, a mutual-capacitance manner).

According to various embodiments, the dielectric layer 543 may include a dielectric material, for example, a silicon foam, a silicon membrane, an optical clean adhesive (OCA), a sponge, a rubber, a polymer (e.g., polycarbonate (PC), polyethylene terephthalate (PET), or the like).

According to various embodiments, when a touch input (including a touch, hovering, or a "force touch") is received from a user, a haptic actuator 550 may provide the user with haptic feedback (e.g., vibration). To this end, the haptic actuator 550 may include a piezoelectric member, a vibration plate, or the like.

The above-described stacked structure of the display of FIG. 5 may be variously changed as an example. For example, the touch sensor 520 may be directly formed on the rear surface of the cover glass 510 (so-called, cover glass integrated touch panel), may be inserted between the cover glass 510 and the display panel 530 after being separately manufactured (so-called, an add-on touch panel), may be directly formed on the display panel 530 (so-called, an on-cell touch panel), or may be included in the display panel 530 (so-called, an in-cell touch panel). According to various embodiments, the first electrode 541 of the pressure sensor 540 may be attached to the display panel 530 after being formed in a circuit board (e.g., a FPCB), or the first electrode 551 of the pressure sensor 540 may be directly formed on the rear surface of the display panel 530.

Figure 6:
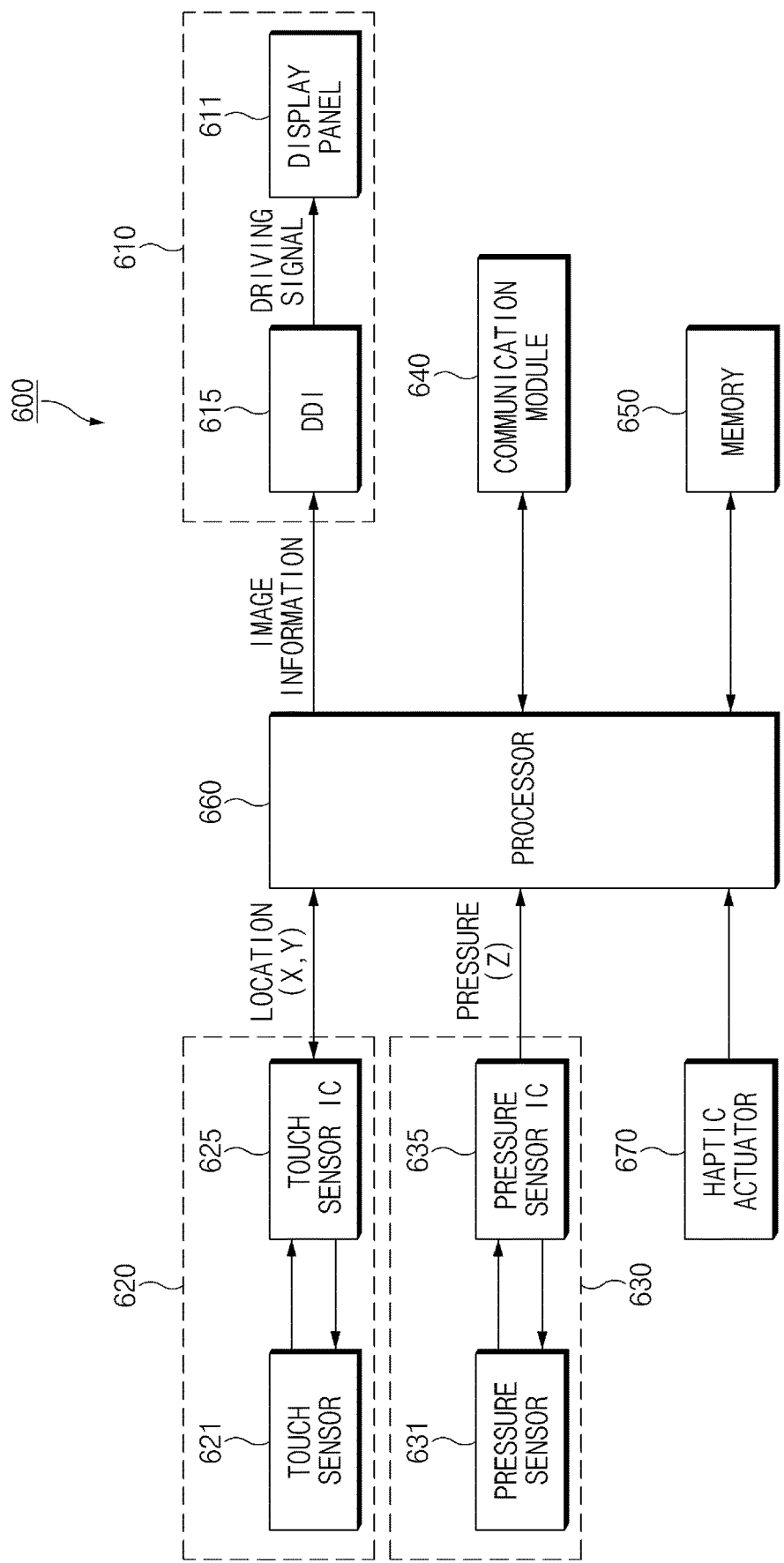
FIG. 6 illustrates a block diagram of an electronic device, according to an embodiment.

FIG. 6 illustrates a block diagram of an electronic device, according to an embodiment.

Referring to FIG. 6, an electronic device 600 according to an embodiment may include a display 610, an input module 620, a pressure sensor module 630, a communication module 640, a memory 650, and a processor 660.

According to an embodiment, the display 610 may include a display panel 611 and a display driving IC (DDI) 615. The display panel 611 may receive an image driving signal from the DDI 615. The display panel 611 may display a user interface or a variety of content (e.g., a text, an image, a video, an icon, a symbol, or the like) based on the image driving signal.

According to various embodiments, the DDI 615 may transmit the image driving signal corresponding to image information, which is received from the processor 660 (e.g., a host), to the display panel 611 at a preset frame rate. Although not illustrated in FIG. 6, according to various embodiments, the DDI 615 may include a graphic RAM, an interface module, an image processing unit, a multiplexer, a display timing controller (T-con), a source driver, a gate driver, and/or an oscillator.

According to an embodiment, the input module 620 may include a touch sensor 621 (or a touch panel) and a touch sensor IC 625. In the touch sensor 621, a specified physical quantity (e.g., voltage, light intensity, resistance, charge amount, capacitance, or the like) may be changed by the touch of the user. According to an embodiment, the touch sensor 621 may be disposed to be overlapped with the display panel 611.

According to various embodiments, the touch sensor IC 625 may sense a variation in the physical quantity in the touch sensor 621 and may calculate a location (X,Y), at which a touch is made, based on the variation in the physical quantity (e.g., voltage, resistance, capacitance, or the like). The calculated location (coordinates) may be provided to the processor 660.

For example, if a portion of user's body (e.g., a finger), a stylus (an example of an electronic pen), or the like makes contact with glass (not illustrated) of a display, a coupling voltage between a transmitter Tx and a receiver Rx included in the touch sensor 621 may vary. The variation in coupling voltage may be sensed by the touch sensor IC 625, and the touch sensor IC 625 may report coordinates of the location, at which the touch is made, to the processor 660. The processor 660 may obtain data of the location coordinates as an event associated with a user input.

According to various embodiments, the touch sensor IC 625 may be referred to a touch IC, a touch screen IC, a touch controller, a touch screen controller IC, or the like. In the meantime, according to various embodiments, in an electronic device in which the touch sensor IC 625 is not included, the processor 660 may perform a role of the touch sensor IC 625. In addition, according to various embodiments, the touch sensor IC 625 and the processor 660 may be implemented with one configuration (e.g., one-chip).

According to an embodiment, the pressure sensor module 630 may include a pressure sensor 631 and a pressure sensor IC 635. The pressure sensor 631 may sense pressure (or force) applied by an external object (e.g., the finger of the user or a stylus pen). For example, the pressure sensor 631 may sense the pressure that is applied by the finger of the user against a touch screen. According to an embodiment, the physical quantity (e.g., capacitance) between the transmitter Tx (e.g., the first electrode 541 of FIG. 5) and the receiver Rx (e.g., the second electrode 542 of FIG. 5) that are included in the pressure sensor 630 may vary due to the touch.

According to various embodiments, the pressure sensor IC 635 may sense a variation in the physical quantity (e.g., capacitance, or the like) in the pressure sensor 631 and may calculate pressure Z, which is applied by the touch of the user, based on the variation in the physical quantity. The pressure value may be provided to the processor 660 together with the location (X, Y) at which the touch is made.

According to various embodiments, the pressure sensor IC 635 may be referred to a force touch controller, a force sensor IC, a pressure panel IC, or the like. In addition, according to various embodiments, the pressure sensor IC 635 and the touch sensor IC 625 may be implemented with one configuration (e.g., one-chip).

According to various embodiments, the communication module 640 may communicate with an external electronic device (e.g., the first external electronic device 102, the second external electronic device 104, or the server 106 illustrated in FIG. 1). According to an embodiment, the communication module 640 may transmit or receive data to or from the external electronic device through a network (e.g., a mobile communication network or an Internet network). According to an embodiment, the communication module 640 may include a cellular module, a Wi-Fi module, a Bluetooth module, a NFC module, a GNSS module, and the like.

According to various embodiments, the memory 650 may store an instruction or data associated with an operation of the element included in the electronic device 600. For example, the memory 650 may store instructions that, when executed, cause the processor 660 to perform various operations described in the present disclosure.

According to an embodiment, the memory 650 may store information (e.g., a command or data) about a function set to a group icon. For example, the memory 650 may store information about the function set for each group icon.

According to various embodiments, for example, the processor 660 may be electrically connected with elements 610 to 650 included in the electronic device 600 and may perform an arithmetic operation or data processing associated with control and/or communication of the elements included in the electronic device 600. According to an embodiment, the processor 660 (e.g., an application processor) may be implemented with a SoC that includes at least one of a processor (or CPU), a GPU, a memory, and the like.

According to an embodiment, the processor 660 may display the group icon in the display 610. According to an embodiment, the group icon may include a plurality of icons (or a plurality of application icons) associated with a plurality of applications. The user may conveniently manage a plurality of application icons by including the plurality of application icons in one group icon. According to an embodiment, a new application (or an application icon) may be added to the group icon or a part of applications included in the group icon may be deleted, based on the user input.

According to an embodiment, the processor 660 may set a function to the group icon. The function set to the group icon may refer to a function associated with at least two of a plurality of applications included in the group icon.

According to an embodiment, the processor 660 may set a function to the group icon based on the user input. According to an embodiment, if the user input for setting the function to the group icon is received, the processor 660 may identify at least one function that is capable of being set to the group icon. For example, the processor 660 may identify a function that is capable of being set in common to all applications included in the group icon and a function that is capable of being set to a specific application according to a characteristic of the application.

According to an embodiment, the processor 660 may receive function information from each of the plurality of applications included in the group icon and may identify at least one function that is capable of being set to the group icon according to the received function information. For example, the function information may be information about a function that the specific application provides with regard to the group icon, may be set by an application creator, and may be different for each application. According to an embodiment, the processor 660 may identify a function, which is capable of being applied to at least two of the plurality of applications included in the group icon, based on the function information received from each of the plurality of applications.

According to an embodiment, the processor 660 may display a function list including at least one function capable of being set to the group icon, in the display 610. According to an embodiment, the function list may include an application list corresponding to at least one function in addition to a function capable of being set to the group icon. As such, a user intuitively knows applications executing a specific function with reference to a function list.

According to an embodiment, the user may select at least one function set to the group icon by using the function list displayed in the display 610. According to an embodiment, the processor 660 may set at least one function to the group icon based on a user input associated with the function list. For example, the function capable of being set to the group icon may include at least one of update of an application included in the group icon, content update of an application included in the group icon, notification check of an application included in the group icon, and data synchronization (or, sharing of data) between applications included in the group icon. An operation of setting a function to the group icon will be described in detail with reference to FIG. 7.

A haptic actuator 670 may provide feedback based on a touch location (X, Y) and pressure (Z). For example, the haptic actuator 670 may provide haptic feedback (e.g., vibration) corresponding to a signal associated with the touch location and the pressure, under control of the processor 660.

Figure 7:
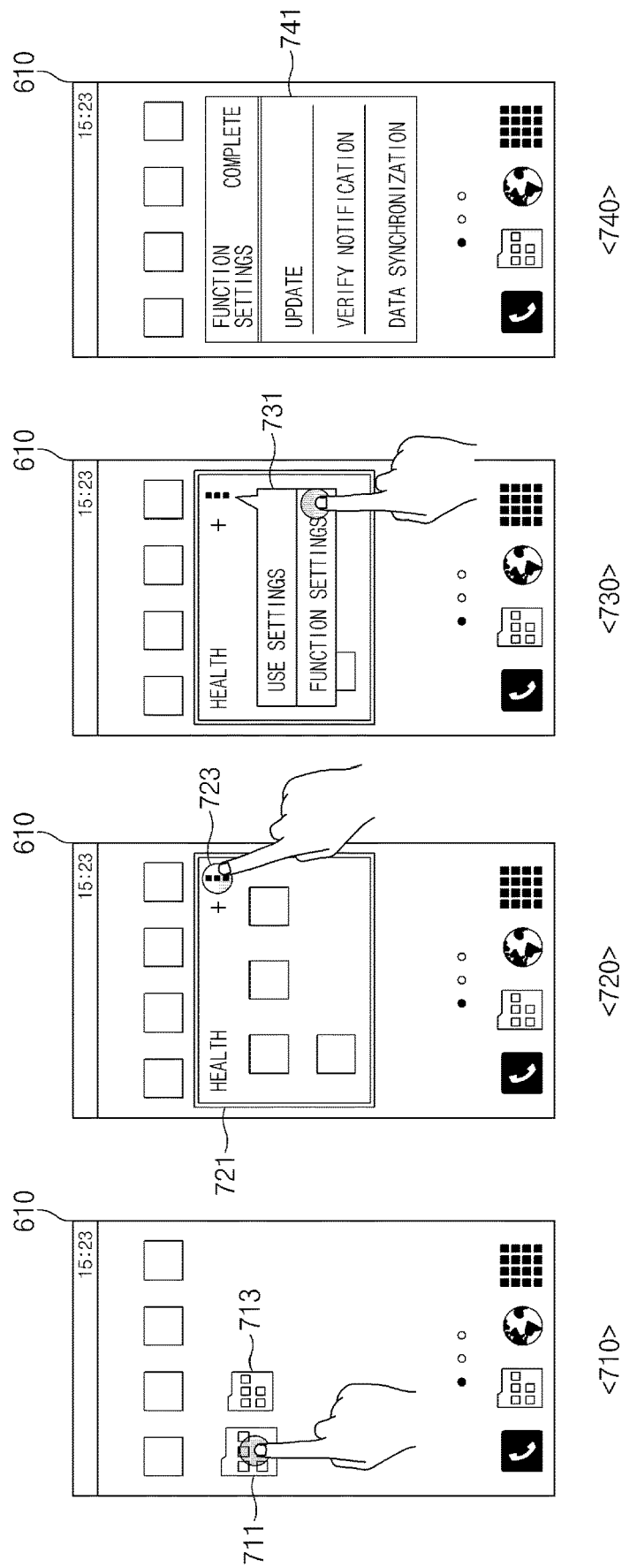
FIG. 7 illustrates a user interface, according to various embodiments of the present disclosure.

FIG. 7 illustrates a user interface, according to various embodiments of the present disclosure.

Referring to an image 710 of FIG. 7, the processor 660 may display at least one or more group icons 711 and 713 in the display 610. For example, each of the group icons may include a plurality of icons (and/or a plurality of application icons) associated with a plurality of applications. If a user input (e.g., a user input, not a force touch) associated with one of the group icons (e.g., the first group icon 711) is received, the processor 660 may display a user interface, as seen in image 720 of FIG. 7 in the display 610.

Referring to the image 720 of FIG. 7, the processor 660 may display a pop-up box 721 including a plurality of application icons included in the selected group icon on the display 610. According to an embodiment, the pop-up box 721 may include an icon 723 which is selectable to provide a menu of various kinds of functions associated with the group icons. If a user input to the icon 723 is received, the processor 660 may display a user interface, as seen in image 730 of FIG. 7 in the display 610.

Referring to the image 730 of FIG. 7, the processor 660 may display a menu 731 for setting a name or a function of the group icon in the display 610. According to an embodiment, if a user input is detected selecting a 'function settings' menu, the processor 660 may display a user interface, such as an image 740 of FIG. 7 in the display 610.

Referring to the image 740 of FIG. 7, the processor 660 may display a function list 741 including at least one function, capable of being set to the group icon, in the display 610. The processor 660 may set at least one function to the group icon when a user input is detected selecting a function included in the function list 741. According to various embodiments, the function included in the function list 741 may vary according to a type of application included in the group icon. For example, the function included in the function list 741 may vary according to function information received from each of applications included in the group icon.

Even though not illustrated in FIG. 7, the user may directly select an application on which the selected function is executed. For example, the processor 660 may identify an application capable of executing each of functions included in the function list 741 and may display an application list corresponding to each of functions included in the function list 741. In the case where the function list 741 includes the application list corresponding to each function, the user may select at least two applications capable of executing the function selected by using the function list 741. The processor 660 may set at least one function and an application executing the function on the group icon, based on the user input.

In the above-mentioned embodiment, it is described that a user selects a function of the group icon. However, the function of the group icon may be automatically selected by the processor 660. According to an embodiment, the processor 660 may select at least one of functions, which are capable of being set to the group icon, based on a specified policy. For example, the processor 660 may preferentially select the function that is capable of being set to a specific application according to a characteristic of the application, rather than the function that is capable of being set in common to all applications included in the group icon.

According to an embodiment, if the function associated with the group icon is set, the processor 660 may store information (hereinafter referred to as "group icon information") about a function set for each group icon in the memory 650. For example, as illustrated in Table 1, the processor 660 may store information about a function set to the group icon and an application executing the function in the memory 650.

TABLE 1

| Group Icon | Function | Application |
|---|---|---|
| group icon 1 | function 1 | app 1, app 2, app 3, app 4 |
| group icon 2 | function 1 | app 5, app 6, app 7, app 8 |
|  | function 2 | app 5, app 6 |

Table 1 illustrates an example of group icon information. Referring to Table 1, a first function "function 1" (e.g., identifying of notification) may be set to a first group icon group icon 1, and first to fourth applications app1 to app4 may execute the first function. In addition, the first function "function 1" and a second function "function 2" (e.g., data synchronization) may be simultaneously set to a second group icon group icon 2. Fifth to eighth applications app5 to app8 may execute the first function. The fifth application app 5 and the sixth application app 6 may execute the second function.

According to an embodiment, the processor 660 may receive the specified user input associated with the group icon through the input module 620. According to an embodiment, the processor 660 may detect pressure, which is applied to a display (or a touch screen) by the finger of the user, by using the pressure sensor module 630. If pressure corresponding to a touch input of the user to the group icon is not less than a specified pressure (i.e., if a force touch is performed on the group icon), the processor 660 may determine that the specified user input associated with the group icon is received.

According to an embodiment, if a specified user input associated with the group icon is received, the processor 660 may execute a function set to the group icon. For example, the processor 660 may control at least two applications corresponding to the function set to the group icon to execute the function set to the group icon. For example, the processor 660 may identify a function set to the group icon and applications executing the set function by using group icon information stored in the memory 650. The processor 660 may transmit a command for executing the set function to the identified applications, and the applications may execute the set function under control of the processor 660.

According to an embodiment, in the case where the function set to the group icon is a notification identifying function of an application, the processor 660 may transmit a notification identifying command to the application included in the group icon. The applications receiving the notification identifying command may identify the notification under control of the processor 660.

According to an embodiment, the electronic device 600 may include middleware (e.g., a notification manager) that manages the notification of the applications installed in the electronic device 600. In this case, the processor 660 may transmit a command for identifying the notification of the applications included in the group icon to the notification manager. The notification manager may identify notifications of the applications included in the group icon based on the command. For example, the notification manager may delete notification displaying information (e.g., a badge or a banner) of the applications included in the group icon.

According to an embodiment, in the case where the function set to the group icon is an update function of an application, the processor 660 may transmit an application update command to applications included in the group icon. The applications receiving the application update command may make a request to a server (e.g., an application server or an application store) for update data of each application under control of the processor 660, and may execute the update by using the update data received from the server. According to an embodiment, if the application update command is received, the application may determine whether update to be executed is present. In the case where there is no update to be executed, the application may omit an update operation in spite of the application update command.

According to an embodiment, the electronic device 600 may include the middleware (e.g., the package manager 347 of FIG. 3) that manages the update of the applications installed in the electronic device 600. In this case, the processor 660 may transmit a command for executing the update of the applications included in the group icon to the package manager. The package manager may identify an update state of the applications included in the group icon based on the command and may execute the update of the applications utilized for the update.

According to an embodiment, in the case where the function set to the group icon is a content update function of an application, the processor 660 may transmit a content update command to the applications included in the group icon. The applications receiving the content update command may make a request to each server (e.g., the application server) for update content under control of the processor 660 and may receive the latest content from the server. The content may include all types of content associated with an event that is capable of occurring with regard to the application included in the group icon. For example, the content may include weather information associated with a weather application, stock information associated with a stock application, news information associated with a news application, SNS notification information associated with an SNS application, and discount event information associated with a shopping application.

Figure 8:
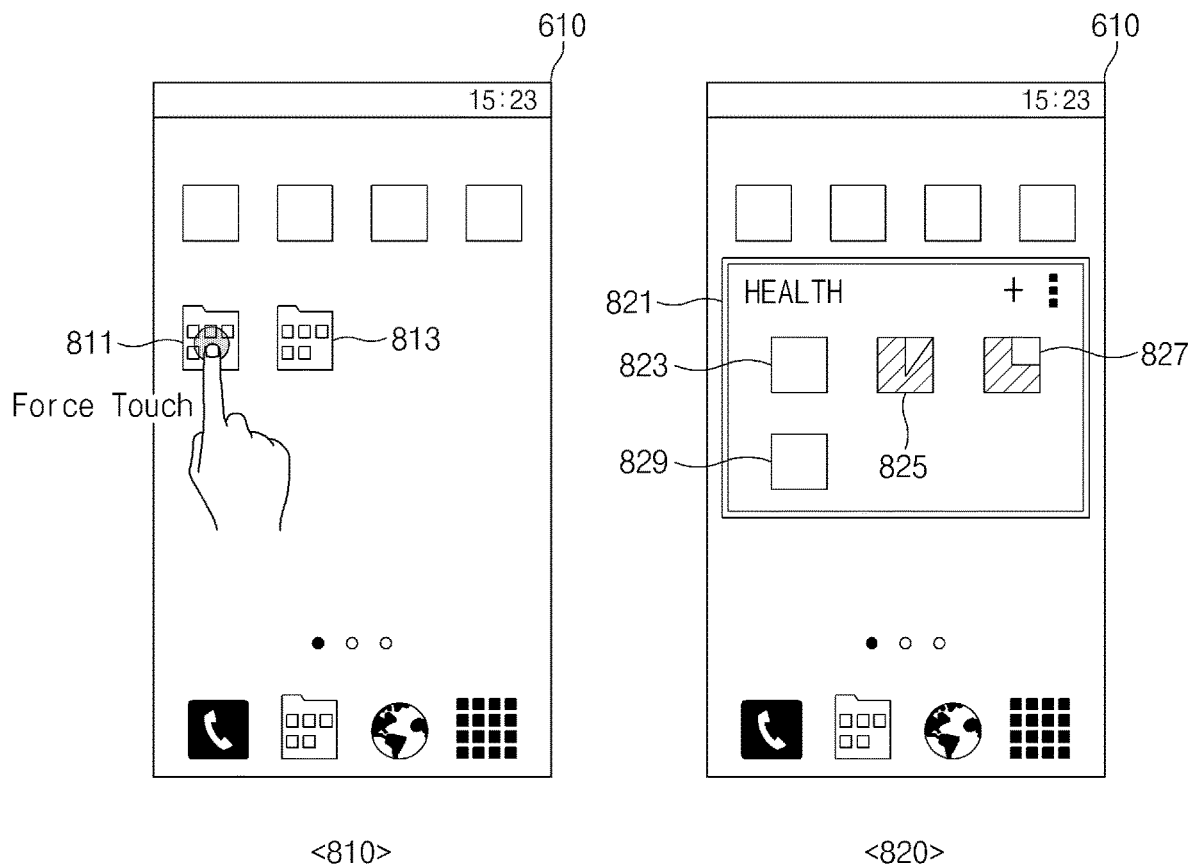
FIG. 8 illustrates a user interface, according to various embodiments of the present disclosure.

FIG. 8 is a view illustrating a user interface, according to various embodiments of the present disclosure.

Referring to an image 810 of FIG. 8, the processor 660 may display at least one or more group icons 811 and 813 in the display 610. For example, each of the group icons may include a plurality of icons (or a plurality of application icons) associated with a plurality of applications. If a specified user input (e.g., a "force touch") associated with a group icon (e.g., the first group icon 811) is received, the processor 660 may display a user interface, such as an image 820 of FIG. 8, in the display 610.

Referring to the image 820 of FIG. 8, the processor 660 may display a pop-up box 821 including a plurality of application icons 823, 825, 827, and 829 included in the group icon in the display 610. According to an embodiment, the processor 660 may execute the update of an application from among a plurality of applications included in the group icon. According to an embodiment, the processor 660 may display a state in which the update is being executed, by using an application icon (e.g., a second application icon 825 and a third application icon 827) in which the update is executed, as depicted in image 820 of FIG. 8, in which the status of the update is indicated over the icons 825 and 827.

According to an embodiment, in the case where the function set to the group icon is a data synchronization (or, sharing) function, the processor 660 may transmit a data sharing command to the applications included in the group icon.

According to an embodiment, the processor 660 may identify shared data (or data for sharing) of applications. The shared data may refer to data capable of being shared with another application and may vary for each application. For example, the shared data associated with a health application may include profile data of a user (e.g., age, height, weight, or the like), biometric data of the user (e.g., a heart rate, blood pressure, or the like), food intake data (a food type, intake time, calories, or the like) or exercise data of the user (e.g., an exercise time, an exercise distance, an exercise type, an exercise schedule, an exercise goal, or the like). For example, the shared data associated with the social network service (SNS) application may include profile data (e.g., a profile picture, a text, or the like) and posting data (e.g., a picture, a text, a video, music data, or the like). For example, the shared data associated with a financial application may include a public certificate that is capable of being used for a financial transaction.

According to an embodiment, the processor 660 may determine whether the same type of shared data is present among the identified shared data. For example, the processor 660 may determine that profile data or exercise data of today's date of each of a first health application and a second health application are the same type of shared data. As another example, the processor 660 may determine that pieces of profile data of a first SNS application and a second SNS application are the same type of shared data. As another example, the processor 660 may determine that a public certificate registered in each of a first financial application and a second financial application is the same type of shared data.

According to an embodiment, if the same type of shared data is present, the processor 660 may determine the priority of the same type of shared data. According to an embodiment, the processor 660 may determine the priority based on at least one of update time (or creation time) of data, a user input, and usage frequency (e.g., execution time, the number of executions, or the like) of an application. For example, the processor 660 may set the priority of recently updated shared data to be high. As another example, the processor 660 may set the priority of the shared data associated with an application, of which the use frequency is relatively high, to be high. As another example, if the same type of shared data is present, the processor 660 may display information about the same type of shared data in the display 610 and may determine the priority of the shared data based on a user input.

According to an embodiment, the processor 660 may synchronize data stored in an application by using the identified sharing data. For example, in the case where the first health application includes profile data and the second health application does not include the profile data, the processor 660 may register the profile data in the second health application by using the profile data of the first health application. As another example, if the posting data uploaded through the first SNS application today is present, the processor 660 may upload the posting data of the first SNS application through the second SNS application.

According to an embodiment, if the same type of shared data is present, the processor 660 may synchronize data by using the shared data of which the priority is high. For example, in the case where each of the first health application and the second health application includes profile data, the processor 660 may update profile data (e.g., the profile data of the second health application) of another application by using profile data (e.g., the profile data of the first health application) of which the priority is high. As another example, in the case where each of the first health application and the second health application includes exercise data of today's date, the processor 660 may update the exercise data of today's date of another application by using exercise data (e.g., exercise data of the first health application) of which the priority is high.

Various examples in which a data synchronization function is executed according to a user input will be described below.

According to an embodiment, the group icon may include the first health application and the second health application. After executing the first health application, the user may do exercise. As such, the first health application may record exercise data or biometric data of the user. After executing the second application, the user may enter a type, an amount, calorie, or the like of the food the user has ingested today. If the user enters a specified user manipulation with respect to the group icon, exercise data or biometric data recorded by the first health application may be shared with the second health application, and food intake data input through the second health application may be shared with the first health application.

According to an embodiment, the group icon may include the first financial application and the second financial application. After executing the first financial application included in the group icon, the user may register a public certificate in the first financial application. If the user enters the specified user manipulation with respect to the group icon, the public certificate registered in the first financial application may be registered in the second financial application. According to an embodiment, if the specified user input associated with the group icon is received, the processor 660 may determine whether the second financial application uses the public certificate of which the type is the same as that of the first financial application. If it is determined that the second financial application uses the public certificate of which the type is the same as that of the first financial application, the processor 660 may proceed to a procedure of registering the public certificate registered in the first financial application in the second financial application.

According to an embodiment, the group icon may include the first SNS application and the second SNS application. The user may upload posting data (e.g., a picture, a text, or the like) to a first SNS server by using the first SNS application. If the user enters a specified user manipulation with respect to the group icon, the processor 660 may upload posting data uploaded by the first SNS application to the second SNS server through the second SNS application. According to an embodiment, the processor 660 may revise a portion of posting data based on an interface or a data type that the second SNS application supports. For example, in the case where the second SNS application does not allow a text of a specified length or more, the processor 660 may omit a portion of text data uploaded through the first SNS application and may upload the rest. As another example, in the case where the second SNS application supports upload of location information, the processor 660 may additionally upload information about a location at which the picture uploaded through the first SNS application is photographed.

Since a function and data field provided for each application is different in spite of the same type of application, a portion of a type of shared data may be different. According to an embodiment, in the case where a portion of shared data of the first application and the second application included in the group icon is different, the processor 660 may share the same type of shared data in consideration of a title of the shared data, a data field level of the shared data, and the like. For example, with regard to food intake data, the shared data of the first health application may include a type of a food taken per breakfast, lunch or dinner and calorie data for each food type in addition to data of the total calorie taken in a day and the total calorie taken per breakfast, lunch, or dinner. The shared data of the second health application may include data of the total calorie taken per breakfast, lunch or dinner, a type of a food, and calorie data for each food type. When the processor 660 updates data of the second application by using the shared data of the first application, the processor 660 may synchronize data by using the data of the calorie taken per breakfast, lunch or dinner or the data of the total calorie taken in a day other than the type of the food and the calorie data for each food type. As another example, the first SNS application may serve image data (e.g., a picture) and text data, and the second SNS application may serve the text data other than the image data. When the processor 660 synchronizes data of each of the first SNS application and the second SNS application, the processor 660 may use the text data other than the image data.

According to an embodiment, it is described that the group icon includes a plurality of icons associated with a plurality of applications. However, according to another embodiment, the group icon may include a plurality of contents. For example, the group icon may be a folder including pieces of image data (e.g., pictures) or video data in a gallery application. As another example, the group icon may be a folder including pieces of audio data (e.g., music data) in an audio playing application. As another example, the group icon may be a folder including pieces of memo data in a memo application.

According to an embodiment, the group icon may include the first image and the second image. The user may enter watermark or tag data (e.g., a time, a place, or the like) inserted into the first image or may apply an image effect (e.g., an image filter, a gray scale, or the like). When the user enters a specified user manipulation with respect to the group icon, the data inserted into the first image or an image effect applied to the first image may be applied to the second image. For example, if the specified user manipulation with respect to the group icon is received, the processor 660 may identify the data inserted into the first image or the image effect applied to the first image and may apply the data or the image effect to the second image.

According to an embodiment, the group icon may include the first audio and the second audio. Volume levels of the first audio data and the second audio data may be different from each other. For example, the volume level of audio data itself may be different in an environment in which the output level of a speaker is the same. According to an embodiment, if the specified user input associated with the group icon is received, the processor 660 may set the volume level of the first audio data and the volume level of the second audio data to be the same as each other. For example, the processor 660 may change the volume level of the first audio data into the volume level of the second audio data or may change the volume level of the second audio data into the volume level of the first audio data.

According to an embodiment, the group icon may include the first memo data and the second memo data. For example, the first memo data and the second memo data may be write data entered by the user. According to an embodiment, if the specified user input associated with the group icon is received, the processor 660 may change the first memo data and the second memo data included in the group icon into text data.

Figure 9:
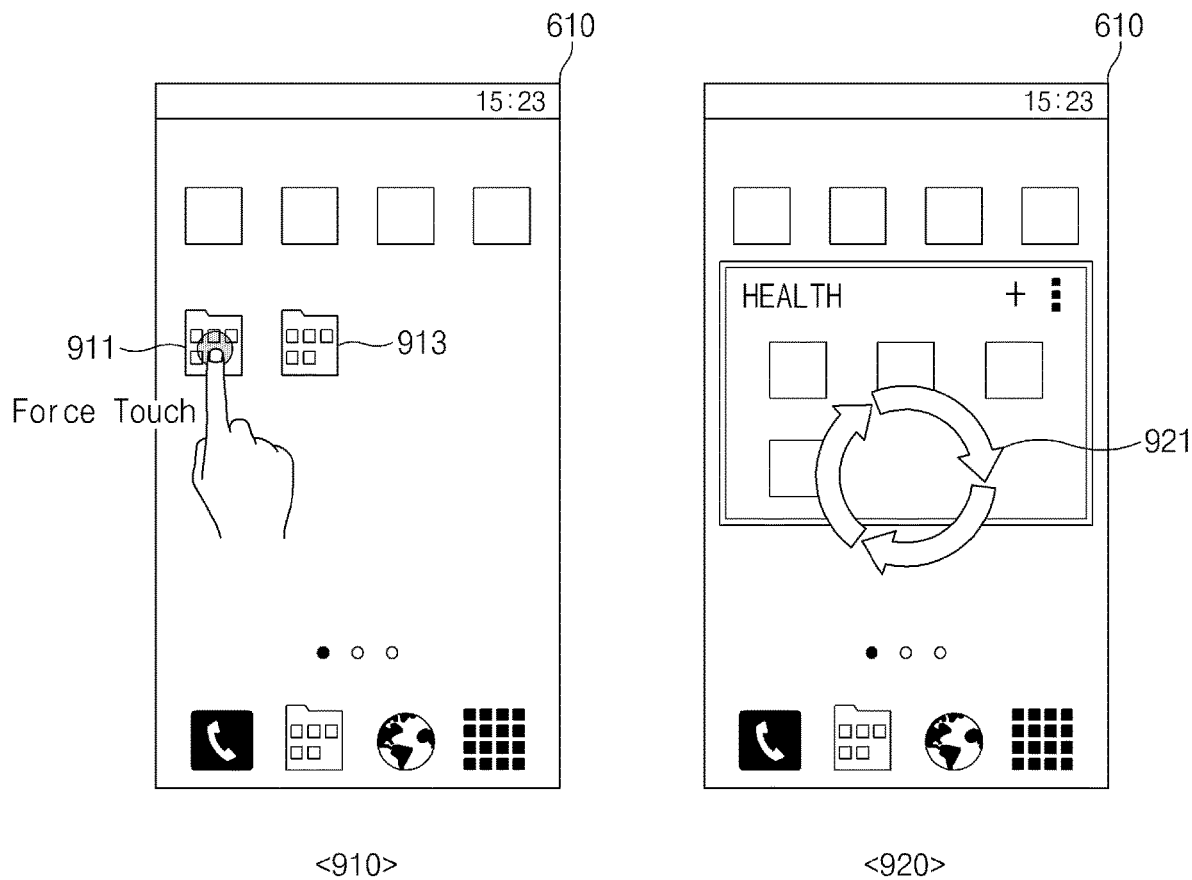
FIG. 9 illustrates a user interface, according to various embodiments of the present disclosure.

FIG. 9 is a view illustrating a user interface, according to various embodiments of the present disclosure.

Referring to an image 910 of FIG. 9, the processor 660 may display at least one or more group icons 911 and 913 in the display 610. For example, each of the group icons may include a plurality of icons (or a plurality of application icons) associated with a plurality of applications. If a specified user input (e.g., a force touch) associated with a group icon (e.g., the first group icon 911) is received, the processor 660 may display a user interface, such as an image 920 of FIG. 9, in the display 610.

Referring to an image 920 of FIG. 9, the processor 660 may display an object 921 indicating that data synchronization is being performed, in a the display 610. The object 921 may be an animation object (e.g., animated). For example, each arrow included in the object 921 may be animated as to continuously rotate clockwise while the data synchronization is performed.

FIG. 10 is a view illustrating a synchronization result, according to various embodiments of the present disclosure.

An image 1010 of FIG. 10 indicates a data state of an application before data synchronization is performed, and an image 1020 of FIG. 10 indicates a data state of the application after the data is synchronized.

Referring to the image 1010 of FIG. 10, a group icon associated with health may include a first health application 1001 and a second health application 1003. The first health application 1001 may include first shared data 1005, and the second health application 1003 may include second shared data 1007. The first shared data 1005 may include profile data including a name (e.g., Mr. Kim), age (29), height (180 cm), and weight (94 kg) and today's calorie data including intake calorie data (1800 kcal) and calorie consumption data (900 kcal). The second shared data 1007 may include profile data including the name (Mr. Kim) and the age (29). Unlike the first shared data 1005, the second shared data 1007 may not include data associated with the height and the weight in the profile data and may not include the today calorie data.

According to an embodiment, if a specified user input (e.g., a force touch) associated with the group icon associated with the health is received, the processor 660 may synchronize (or share) data of the first health application 1001 and the second health application 1003. For example, the processor 660 may synchronize data by using the first shared data 1005 of which the priority is high.

Referring to the image 1020 of FIG. 10, the second shared data 1007 of the second health application 1003 may be updated according to the data synchronization.

FIG. 11 is a view illustrating a synchronization result, according to various embodiments of the present disclosure.

An image 1110 of FIG. 11 indicates a data state of an application before data synchronization is performed, and an image 1120 of FIG. 11 indicates a data state of the application after the data synchronization is performed.

Referring to the image 1110 of FIG. 11, a group icon associated with an SNS may include a first SNS application 1101 and a second SNS application 1103. The first SNS application 1101 may upload posting data to a first SNS server, and the second SNS application 1103 may upload the posting data onto a second SNS server. The first SNS application 1101 may include first shared data 1105, and the second SNS application 1103 may include second shared data 1107. The first shared data 1105 may include the posting data including an image and a text uploaded on May 12th.

The second shared data 1107 may include the posting data including an image and a text uploaded on April 25th.

According to an embodiment, if a specified user input (e.g., a force touch) associated with the group icon associated with the SNS is received, the processor 660 may perform the data synchronization (or data sharing) of the first SNS application 1101 and the second SNS application 1103. The processor 660 may synchronize data by using the first shared data 1105 of which the priority is high. For example, the processor 660 may upload the first shared data 1105 to the second SNS server through the second SNS application 1103.

Referring to the image 1120 of FIG. 11, after the data synchronization, the shared data 1107 of the second SNS application 1103 may include the first shared data 1005 of the first application 1001 as the shared data.

FIG. 12 is a view illustrating a synchronization result, according to various embodiments of the present disclosure.

An image 1210 of FIG. 12 indicates a data state of an application before data synchronization is performed, and an image 1220 of FIG. 12 indicates a data state of the application after the data synchronization is performed.

Referring to the image 1210 of FIG. 12, a group icon associated with health may include a first health application 1201 and a second health application 1203. The first health application 1201 may include first shared data 1205, and the second health application 1203 may include second shared data 1207. The first shared data 1205 may include data of the total calorie (900 kcal) taken at lunch and data of the total calorie (1000 kcal) taken at dinner, a type of a food taken per each meal, and calorie data for each food type. The second shared data 1207 may include data of the total calorie (300 kcal) taken at breakfast. The second shared data 1207 may not include a data field associated with a type of a food and calorie taken and may include data field associated with the total calorie per breakfast, lunch, and dinner. The first shared data 1205 may not include calorie data associated with breakfast, and the second shared data 1207 may not include pieces of calorie data associated with lunch and dinner.

According to an embodiment, if a specified user input (e.g., a force touch) associated with the group icon associated with the health is received, the processor 660 may perform data synchronization (or data sharing) of the first health application 1201 and the second health application 1203. For example, the processor 660 may synchronize pieces of data of the first health application 1201 and the second health application 1203 by using data of the total calorie taken at lunch among the first shared data 1205, data of the total calorie taken at dinner among the first shared data 1205, and data of calorie taken at breakfast among the second shared data 1207.

Referring to the image 1220 of FIG. 12, if the data synchronization is performed, the first shared data 1205 of the first health application 1201 may be updated, and the second shared data 1207 of the second health application 1203 may be updated.

According to various embodiments of the present disclosure, an electronic device may include a display, an input module, and a processor. The processor may be configured to display a group icon including a plurality of icons associated with a plurality of applications in the display, to set a function associated with at least two applications of the plurality of applications to the group icon, and to allow the at least two applications to execute the set function if a specified user input associated with the group icon is received.

According to an embodiment, the electronic device may further include a display. The processor may be configured to identify at least one function capable of being set to the group icon, to display a function list including the at least one function in the display, and to set at least one of functions included in the function list as a function associated with the group icon, based on a user input associated with the function list.

According to an embodiment, the processor may be configured to receive function information from each of a plurality of applications included in the group icon and to identify the at least one function capable of being set to the group icon, based on the function information.

According to an embodiment, the function list may include at least one function capable of being set to the group icon and an application list corresponding to the at least one function.

According to an embodiment, the electronic device may further include a pressure sensor that senses pressure applied to the display. The processor may be configured to determine that the specified user input is received, if the pressure applied to the display by a user input is not less than a specified pressure.

According to an embodiment, the function set to the group icon may be a function to update the at least two applications included in the group icon.

According to an embodiment, the function set to the group icon may be a function to identify a notification associated with the at least two applications included in the group icon.

According to an embodiment, the function set to the group icon may be a function to synchronize data between the at least two applications included in the group icon.

According to an embodiment, the processor may be configured to identify shared data of each of the at least two applications, to determine priority of the same type of shared data if the same type of the shared data among the identified shared data is present, and to synchronize by using the shared data of which the priority is the highest.

According to an embodiment, the processor may be configured to determine the priority based on at least one of update time of the shared data, a user input, and use frequency of an application.

According to various embodiments of the present disclosure, an electronic device may include a housing including a first surface facing in a first direction and a second surface facing in a second direction opposite to the first direction, a touch screen interposed between the first surface and the second surface and exposed to an outside through the first surface, a pressure sensor interposed between the first surface and the second surface and configured to detect pressure of an external object against the touch screen, a processor positioned inside the housing and electrically connected with the touch screen and the pressure sensor, and a memory positioned inside the housing and electrically connected with the processor. The memory may store a plurality of application programs. The memory may store instructions, when executed, causing the processor to display a group icon including a plurality of icons associated with a plurality of applications in the touch screen, to detect pressure of a finger of a user against the touch screen by using the pressure sensor, to detect a location of the finger of the user by using the touch screen, to execute a selected function associated with at least two applications of the plurality of applications without reception of a respective user input associated with the at least two applications of the plurality of applications, based on the detected pressure and the detected location.

Figure 13:
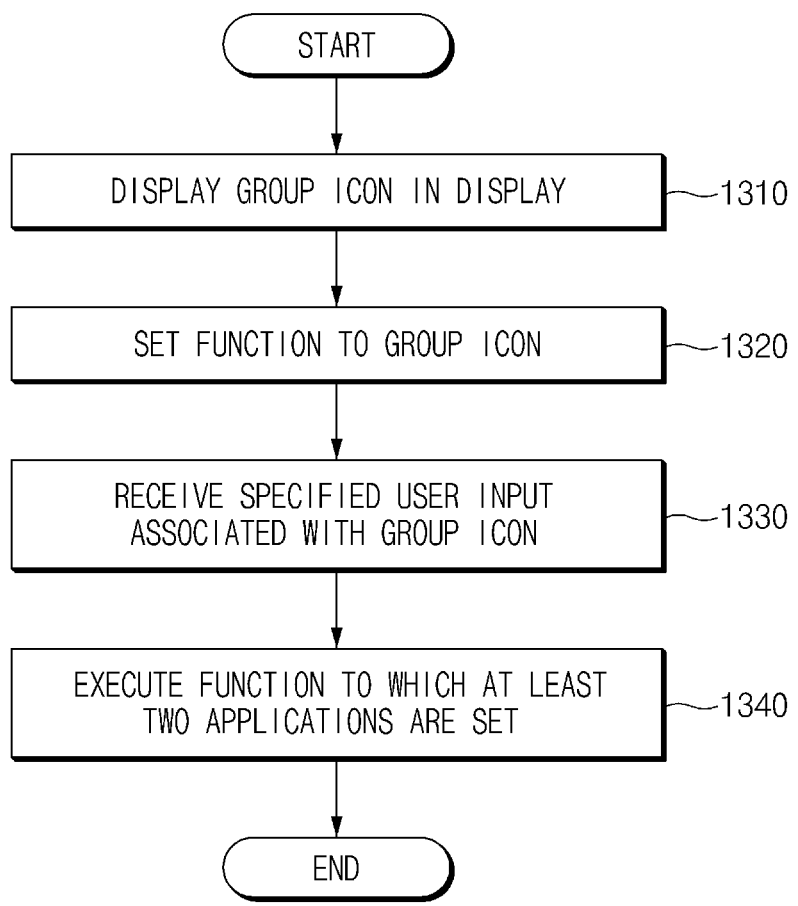
FIG. 13 is a flowchart illustrating a user input processing method of an electronic device, according to various embodiments of the present disclosure.

FIG. 13 is a flowchart illustrating a user input processing method of an electronic device, according to various embodiments of the present disclosure.

The flowchart illustrated in FIG. 13 may include operations that the above-described electronic device (e.g., the electronic device 600) processes. Even though omitted below, detailed descriptions about the electronic device described with reference to FIGS. 1 to 12 may be applied to the flowchart shown in FIG. 13.

According to an embodiment, in operation 1310, an electronic device (e.g., the processor 660) may display a group icon in a display (e.g., the display 610). For example, the group icon may include a plurality of icons (or a plurality of application icons) associated with a plurality of applications.

According to an embodiment, in operation 1320, the electronic device (e.g., the processor 660) may set a function to the group icon. The function set to the group icon may refer to a function associated with at least two of a plurality of applications included in the group icon. For example, the function capable of being set to the group icon may include at least one of update of an application included in the group icon, notification check of an application included in the group icon, and data synchronization (or, sharing) between applications included in the group icon.

According to an embodiment, the processor 660 may set a function to the group icon based on the user input. According to an embodiment, if the user input for setting the function to the group icon is received, the electronic device may identify at least one function that is capable of being set to the group icon. For example, the electronic device may receive function information from each of the plurality of applications included in the group icon and may identify at least one function that is capable of being set to the group icon based on the received function information. The electronic device may display a function list including at least one function capable of being set to the group icon, in the display. The electronic device may set at least one function to the group icon based on a user input associated with the function list. The electronic device may select at least one of functions capable of being set to the group icon, based on a specified policy. According to an embodiment, if the function associated with the group icon is set, the electronic device may store information (hereinafter referred to as "group icon information") about a function set for each group icon in a memory (e.g., the memory 650).

According to an embodiment, in operation 1330, the electronic device (e.g., the processor 660) may receive a specified user input associated with the group icon. According to an embodiment, the electronic device may receive the specified user input associated with the group icon through an input module (e.g., the input module 620). According to an embodiment, the electronic device may detect a threshold level of pressure, which is applied to a display (or a touch screen) by the finger of the user, by using a pressure sensor (e.g., the pressure sensor module 630). If pressure corresponding to a touch input of the user to the group icon is not less than the specified threshold pressure (i.e., if a "force touch" is performed on the group icon), the electronic device may determine that the specified user input associated with the group icon is received.

According to an embodiment, in operation 1340, at least two applications included in the group icon may execute the set function under control of the electronic device (e.g., the processor 660). For example, the electronic device may identify a function set to the group icon and applications, which will execute the set function, by using group icon information stored in the memory. The electronic device may transmit a command for executing the set function to the identified applications, and the applications may execute the set function under control of the electronic device.

According to an embodiment, in the case where a function set to the group icon is a notification identifying function of an application, the electronic device may transmit a notification identifying command to applications included in the group icon or middleware that manages a notification of the applications.

According to an embodiment, in the case where the function set to the group icon is an update function of an application, the electronic device may transmit an update command to the applications included in the group icon or middleware that manages a notification of the applications.

According to an embodiment, in the case where the function set to the group icon is a data synchronization (or, sharing) function, the electronic device may transmit a data sharing command to the applications included in the group icon. According to an embodiment, the electronic device may identify shared data of applications that perform the data sharing. According to an embodiment, the electronic device may synchronize data stored in an application by using the identified shared data.

According to an embodiment, the electronic device may determine whether there is the same type of shared data of the identified shared data. If the same type of shared data is present, the electronic device may determine the priority of the same type of shared data. The electronic device may determine the priority based on at least one of update time (or creation time) of data, a user input, and usage frequency (e.g., execution time, the number of executions, or the like) of an application. According to an embodiment, if the same type of shared data is present, the electronic device may synchronize by using the shared data of which the priority is high.

Figure 14:
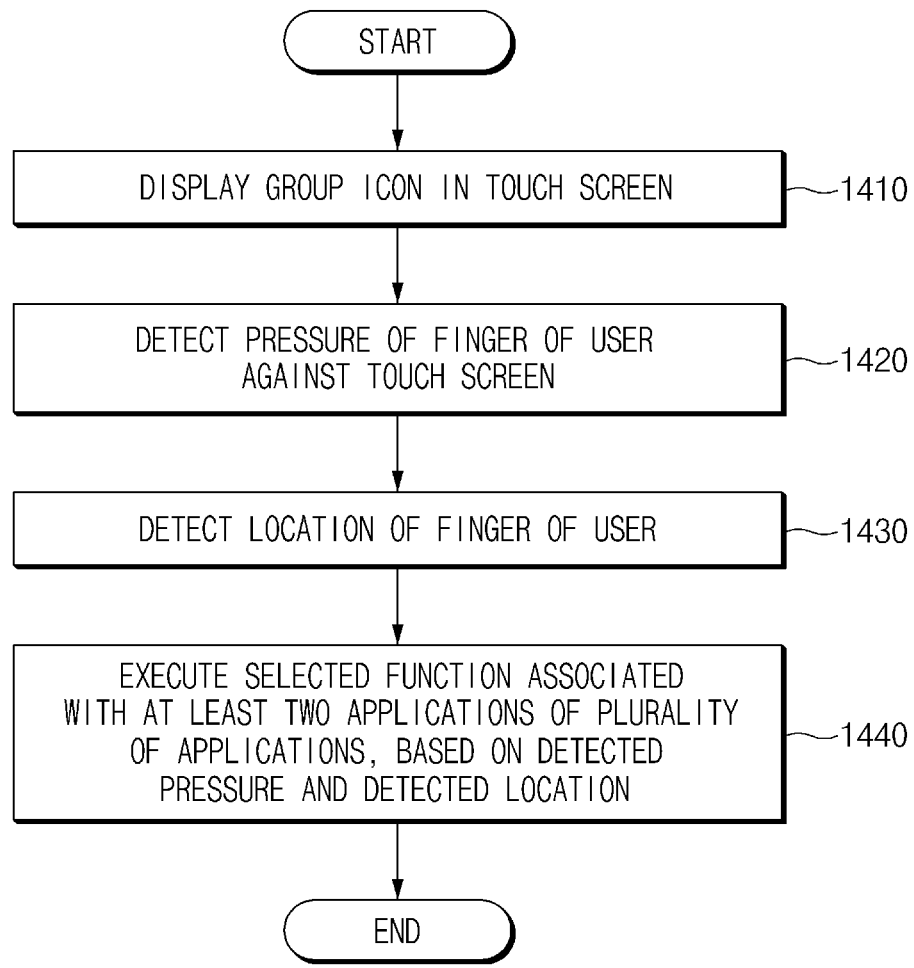
FIG. 14 is a flowchart illustrating a user input processing method of an electronic device, according to various embodiments of the present disclosure.

FIG. 14 is a flowchart illustrating a user input processing method of an electronic device, according to various embodiments of the present disclosure.

The flowchart illustrated in FIG. 14 may include operations that the above-described electronic device (e.g., the electronic device 600) processes. Even though omitted below, detailed descriptions about the electronic device described with reference to FIGS. 1 to 12 may be applied to the flowchart shown in FIG. 14.

According to an embodiment, in operation 1410, the electronic device (e.g., the processor 660) may display a group icon in a touch screen. For example, the group icon may include a plurality of icons (or a plurality of application icons) associated with a plurality of applications.

According to an embodiment, in operation 1420, the electronic device (e.g., the processor 660) may detect pressure of a finger of a user against a touch screen by using a pressure sensor (e.g., the pressure sensor module 630).

According to an embodiment, in operation 1430, the electronic device (e.g., the processor 660) may detect a location of the finger of a touch user by using the touch screen.

According to an embodiment, in operation 1440, the electronic device (e.g., the processor 660) may execute the selected function associated with at least two of a plurality of applications, based on the detected pressure and the detected location.

According to an embodiment, the electronic device may determine whether a specified user input associated with the group icon is received, based on the detected pressure and the detected location. For example, if pressure corresponding to a touch input of the user to the group icon is not less than a specified pressure (i.e., if a force touch is made on the group icon), the electronic device may determine that the specified user input associated with the group icon is received.

According to an embodiment, if the specified user input associated with the group icon is received, at least two applications included in the group icon may execute the set function, under control of the electronic device. For example, the electronic device may identify a function set to the group icon and applications, which will execute the set function, by using group icon information stored in the memory. The electronic device may transmit a command for executing the set function to the identified applications, and the applications may execute the set function under control of the electronic device.

According to various embodiments of the present disclosure, a user input processing method of an electronic device may include displaying a group icon including a plurality of icons associated with a plurality of applications in a display, setting a function associated with at least two of the plurality of applications to the group icon, receiving a specified user input associated with the group icon, and allowing the at least two applications to execute the set function.

According to an embodiment, the setting of the function to the group icon may include identifying at least one function capable of being set to the group icon, displaying a function list including the at least one function in the display, receiving a user input associated with the function list, and setting at least one of functions included in the function list as a function associated with the group icon based on the user input.

According to an embodiment, the identifying of the at least one function list may include receiving function information from each of a plurality of applications included in the group icon, and identifying the at least one function capable of being set to the group icon based on the function information.

According to an embodiment, the function list may include at least one function capable of being set to the group icon and an application list corresponding to the at least one function.

According to an embodiment, the receiving of the specified user input associated with the group icon may include receiving a user input associated with the display, sensing pressure applied to the display by the user input, and determining that the specified user input is received, if the pressure applied to the display by a user input is not less than a specified pressure.

According to an embodiment, the function set to the group icon may be a function to update the at least two applications included in the group icon.

According to an embodiment, the function set to the group icon may be a function to identify a notification associated with the at least two applications included in the group icon.

According to an embodiment, the function set to the group icon may be a function to synchronize data between the at least two applications included in the group icon.

According to an embodiment, the executing of the set function may include identifying shared data of each of the at least two applications, determining priority of the same type of shared data if the same type of the shared data among the identified shared data is present, and synchronizing by using the shared data of which the priority is the highest.

According to various embodiments of the present disclosure, a specific function may be executed with regard to a plurality of application icons included in a group icon by entering a user input associated with a group icon once without a plurality of user inputs, thereby increasing user convenience.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the one or more processors to perform a function corresponding to the instruction. The computer-readable storage media, for example, may be a memory.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a display; and
   a processor configured to:
   control the display to display a group icon representing a plurality of icons associated with a plurality of applications;
   control, based on a detected touch input to the group icon on the display, the display to display a setting icon and the plurality of icons included in the group icon;
   control the display to display a function setting menu based on a user input to the setting icon;
   control the display to display a function list including at least one function based on a user input to the function setting menu;
   set one of the at least one function included in the function list for a common function applied to at least two applications of the plurality of applications according to a user input to the function list; and
   execute, based on a detected force touch input to the group icon on the display, the common function to the at least two applications of the plurality of applications.

2. The electronic device of claim 1, wherein the processor is configured to:
   identify at least one function capable of execution in response to detecting the force touch input to the group icon.

3. The electronic device of claim 2, wherein the processor is configured to:
   receive function information indicating available functions from each of the plurality of applications included in the group icon; and
   identify the at least one function based on the received function information.

4. The electronic device of claim 2, wherein the function list further includes an application list corresponding to the at least one function.

5. The electronic device of claim 1, further comprising:
   a pressure sensor configured to detect pressure applied to the display,
   wherein the processor is configured to:
   determine that the force touch input is received, if the pressure applied to the display is greater than or equal to a specified pressure threshold.

6. The electronic device of claim 1, wherein the common function set to the group icon includes updating the at least two applications included in the group icon.

7. The electronic device of claim 1, wherein the common function set to the group icon includes identifying a notification associated with the at least two applications included in the group icon.

8. The electronic device of claim 1, wherein the common function set to the group icon includes synchronizing data between the at least two applications included in the group icon.

9. The electronic device of claim 8, wherein the processor is configured to:
   identify first data and second data from among data of the at least two applications, wherein the first data and the second data are of a same data type;
   determine at least one priority of the first data and the second data; and
   synchronize data between the at least two applications using one of the first data and the second data based on the at least one priority.

10. The electronic device of claim 9, wherein the processor is configured to:
    determine the priority based on at least one of an update time of at least one of the first data and the second data, a user input, and a use frequency of an application.

11. A method in an electronic device, comprising:
    displaying a group icon representing a plurality of icons associated with a plurality of applications in a display;
    controlling the display to display a setting icon and the plurality of icons included in the group icon, based on a detected touch input to the group icon on the display;
    controlling the display to display a function setting menu based on a user input to the setting icon;
    controlling the display to display a function list including at least one function based on a user input to the function setting menu;
    setting one of the at least one function included in the function list for a common function applied to at least two applications of the plurality of applications according to a user input to the function list; and
    executing the common function to the at least two applications of the plurality of applications, based on a detected force touch input to the group icon on the display.

12. The method of claim 11, further comprising:
    identifying at least one function capable of execution in response to detecting the force touch input to the group icon before the controlling the display to display the function list.

13. The method of claim 12, wherein the identifying of the at least one function includes:
    receiving function information indicating available functions from each of the plurality of applications included in the group icon; and
    identifying the at least one function based on the received function information.

14. The method of claim 12, wherein the function list further includes an application list corresponding to the at least one function.

15. The method of claim 11, further comprising:
    determining that the force touch input is received, if a pressure applied to the display by the force touch input as detected by a pressure sensor is greater than or equal to a specified pressure threshold.

16. The method of claim 11, wherein the common function set to the group icon includes updating the at least two applications included in the group icon.

17. The method of claim 11, wherein the common function set to the group icon includes identifying a notification associated with the at least two applications included in the group icon.

18. The method of claim 11, wherein the setting of the common function includes synchronizing data between the at least two applications included in the group icon.

19. The method of claim 18, wherein the executing of the set common function includes:
    identifying first data and second data from among data of the at least two applications, wherein the first data and the second data are of a same data type;

determining priority of the first data and the second data; and synchronizing data between the at least two applications using one of the first data and the second data based on the priority.

20. An electronic device comprising:

a housing including a first surface oriented in a first direction and a second surface oriented in a second direction opposite to the first direction;

a touch screen interposed between the first surface and the second surface and exposed to an exterior of the electronic device through the first surface;

a pressure sensor interposed between the first surface and the second surface and configured to detect pressure of an external object placed against the touch screen;

a processor disposed within the housing and electrically coupled with the touch screen and the pressure sensor; and a memory disposed within the housing and electrically coupled with the processor, wherein the memory stores a plurality of application programs, and wherein the memory stores instructions executable by the processor to:

control the touch screen to display a group icon representing a plurality of icons associated with a plurality of applications;

in response to detecting a user input, detect a pressure from the user input against the touch screen using the pressure sensor;

detect a location of the user input using the touch screen;

control the touch screen to display a setting icon and the plurality of icons included in the group icon, based on a detected touch input to the group icon on the display;

control the display to display a function setting menu based on a user input to the setting icon;

control the display to display a function list including at least one function based on a user input to the function setting menu;

set one of the at least one function included in the function list for a common function applied to at least two applications of the plurality of applications according to a user input to the function list; and execute the common function to the at least two applications, based on a detected force touch input to the group icon on the display.

* * * * *